us008787181B2

(12) United States Patent
Gaal et al.

(10) Patent No.: US 8,787,181 B2
(45) Date of Patent: Jul. 22, 2014

(54) RESOURCE ALLOCATION RANDOMIZATION

(75) Inventors: Peter Gaal, San Diego, CA (US); Durga Prasad Malladi, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 903 days.

(21) Appl. No.: 12/352,746

(22) Filed: Jan. 13, 2009

(65) Prior Publication Data

US 2009/0181692 A1 Jul. 16, 2009

Related U.S. Application Data

(60) Provisional application No. 61/021,005, filed on Jan. 14, 2008.

(51) Int. Cl.
| | | |
|---|---|---|
| H04L 12/56 | (2006.01) | |
| H04J 13/16 | (2011.01) | |
| H04J 1/16 | (2006.01) | |
| H04W 72/08 | (2009.01) | |
| H04L 27/26 | (2006.01) | |
| H04L 5/00 | (2006.01) | |

(52) U.S. Cl.
CPC .............. *H04J 13/16* (2013.01); *H04W 72/082* (2013.01); *H04L 27/2613* (2013.01); *H04L 5/0023* (2013.01); *H04L 5/0053* (2013.01); *H04L 5/0007* (2013.01)
USPC ............................. 370/252; 370/329; 370/419

(58) Field of Classification Search
USPC ......................................... 370/252, 329, 419
See application file for complete search history.

(56) References Cited

U.S. PATENT DOCUMENTS

| | | | |
|---|---|---|---|
| 5,111,416 | A | 5/1992 | Harada |
| 5,596,571 | A | 1/1997 | Gould et al. |
| 6,339,781 | B1 | 1/2002 | Sasaki |
| 6,590,951 | B1 | 7/2003 | Kim et al. |
| 6,798,736 | B1 | 9/2004 | Black et al. |

(Continued)

FOREIGN PATENT DOCUMENTS

| | | |
|---|---|---|
| CN | 1689259 A | 10/2005 |
| CN | 1891000 A | 1/2007 |

(Continued)

OTHER PUBLICATIONS

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.

(Continued)

*Primary Examiner* — John Pezzlo
(74) *Attorney, Agent, or Firm* — Paul Kuo

(57) ABSTRACT

Different sequence resources can be allocated to a mobile device where the mobile device can exclusively uses the sequence resource with regard to a base station during a communication session. However, if another mobile device using another base station is assigned a matching sequence resource, then there can be interference if the mobile devices are relatively close enough together. Therefore, randomization of the sequence resources can take place—moreover, a cyclic shift result can be employed in sequence resource allocation to attempt to minimize interference.

30 Claims, 15 Drawing Sheets

(56) References Cited

U.S. PATENT DOCUMENTS

| | | | |
|---|---|---|---|
| 6,831,905 B1* | 12/2004 | Lomp et al. | 370/335 |
| 6,922,435 B2 | 7/2005 | Neufeld et al. | |
| 8,169,944 B2 | 5/2012 | Walton et al. | |
| 8,208,364 B2 | 6/2012 | Walton et al. | |
| 2002/0012384 A1 | 1/2002 | Berens | |
| 2003/0223397 A1 | 12/2003 | Iacono et al. | |
| 2004/0062397 A1 | 4/2004 | Amer | |
| 2004/0233885 A1 | 11/2004 | Helmke | |
| 2005/0169349 A1 | 8/2005 | Hwang et al. | |
| 2006/0206780 A1 | 9/2006 | Ariyama | |
| 2006/0290508 A1 | 12/2006 | Moutchkaev et al. | |
| 2007/0025462 A1 | 2/2007 | Sato | |
| 2007/0037541 A1 | 2/2007 | Wu et al. | |
| 2007/0082696 A1 | 4/2007 | Wang | |
| 2007/0230600 A1 | 10/2007 | Bertrand et al. | |
| 2007/0253465 A1* | 11/2007 | Muharemovic et al. | 375/130 |
| 2008/0043680 A1 | 2/2008 | Fitton | |
| 2008/0080472 A1* | 4/2008 | Bertrand et al. | 370/344 |
| 2009/0092148 A1 | 4/2009 | Zhang et al. | |
| 2009/0136034 A1 | 5/2009 | Gaal et al. | |
| 2009/0204824 A1* | 8/2009 | Lin et al. | 713/193 |
| 2009/0249027 A1 | 10/2009 | Kim et al. | |
| 2010/0220664 A1* | 9/2010 | Hooli et al. | 370/329 |
| 2013/0094391 A1* | 4/2013 | Padovani et al. | 370/252 |

FOREIGN PATENT DOCUMENTS

| | | |
|---|---|---|
| CN | 101056469 A | 10/2007 |
| EP | 1092270 A1 | 4/2001 |
| JP | 2001024624 A | 1/2001 |
| JP | 2002543666 | 12/2002 |
| JP | 2003504946 A | 2/2003 |
| JP | 2007028289 A | 2/2007 |
| JP | 2009535936 A | 10/2009 |
| JP | 5100747 B2 | 12/2012 |
| JP | 5130351 B2 | 1/2013 |
| KR | 20070048202 A | 5/2007 |
| RU | 95116586 | 9/1997 |
| RU | 2186460 C1 | 7/2002 |
| RU | 2005115869 A | 10/2005 |
| RU | 2005115873 A | 1/2006 |
| RU | 2303856 C2 | 7/2007 |
| SU | 966864 A1 | 10/1982 |
| SU | 1387177 A1 | 4/1988 |
| WO | 0018055 | 3/2000 |
| WO | WO0060751 A1 | 10/2000 |
| WO | 0065757 A1 | 11/2000 |
| WO | WO0105079 A1 | 1/2001 |
| WO | 0227961 A2 | 4/2002 |
| WO | WO0245288 A2 | 6/2002 |
| WO | WO2004030224 A1 | 4/2004 |
| WO | 2004038951 A2 | 5/2004 |
| WO | 2004038984 A2 | 5/2004 |
| WO | 2004059936 A1 | 7/2004 |
| WO | WO2006102252 A1 | 9/2006 |
| WO | 2006134829 A1 | 12/2006 |
| WO | 2007005978 A2 | 1/2007 |
| WO | 2007023810 A1 | 3/2007 |
| WO | WO2007094775 A1 | 8/2007 |
| WO | 2007127902 A2 | 11/2007 |

OTHER PUBLICATIONS

Choi D-W: "Parallel Scramblung Techniques for Digital Multiplexers" AT & T Technical Journal, American Telephone and Telegraph Co. New York, vol. 65, No. 5, Sep. 1, 1986, pp. 123-136, XP000616778 ISSN: 8756-2324 p. 123-p. 129.

European Search Report—EP10188387, Search Authority—Munich Patent Office, Jan. 21, 2011.
International Search Report and Written Opinion—PCT/US2009/030917, International Search Authority—European Patent Office—Mar. 26, 2009 (080550).
Jian Ren et al: "CDMA physical layer built—i n security enhancement" Vehicular Technology Conference, 2003. VTC 2003-Fall. 2003 IEEE 58th Orlando, FL, USA Oct. 6-9, 2003; [IEEE Vehicular Technolgy Conference], Piscataway, NJ, USA,IEEE, US, vol. 3, Oct. 6, 2003, pp. 2157-2161, XP010701813 ISBN: .978-0-7803-7954-1 p. 2157-p. 2158; figure 1.
Nokia Siemens Networks et al: "Cyclic Shift Hopping and DM RS Signaling" 3rd Generation Partnership Project (3GPP); Technical Specification Group (TSG) Radio Access Network (RAN); Workinggroup 1 (WG1), XX, XX #49, No. R1-072294, May 7, 2007, pp. 1-4, XP002494363, 1. Introduction.
NTT Docomo et al: "Pilot Sequence Allocation Method in EUTRA Uplink" 3GPP TSG RAN WG1 Meeting #46, vol. R1-062103, Aug. 28, 2006, XP050102648 Tallinn, Estonia.
NTT Docomo et al: "Sequence Hopping and Cyclic-Shift Value Hopping for Uplink Reference Signal in E-UTRA" 3GPP TSG-RAN WG1 #48BIS St Julians, Malta, No. R1-071643, Mar. 26, 2007, pp. 1-4, XP002494362.
Walther U et al: "Pn-generators embedded in high performance signal processors" ISCAS 2001. Proceedings of the 2001 IEEE International Symposium on Circuits and Systems. Sydney, Australia, May 6-9, 2001; [IEEE International Symposium on Circuits and Systems], New York, NY : IEEE, US, vol. 4, May 6, 2001, pp. 45-48, XP010541788 ISBN: 978-0-7803-6685-5 pp. IV-46, left-hand column; figure 3 pp. IV-47, left-hand column; figure 6.
Qualcomm Europe, "Completing the Scrambling Details in the specifications," R1-080487, 3GPP RAN1 #51bis meeting (Jan. 18, 2008).
Qualcomm Europe, "Details on Scrambling," R1-074967, 3GPP RAN1 #51 meeting (Nov. 9, 2007).
Qualcomm Europe, "Hopping of UL DM-RS," R1-074950, 3GPP RAN1 #51 meeting (Nov. 9, 2007).
3GPP, "LTE Scrambling Codes," Ericsson, Qualcomm, Nokia, NSN, R1-075089, Nov. 13, 2007, pp. 2.
Motorola, "Uplink DM RS-Open Issues[online]", 3GPP R1-080065, <URL:http://www.3gpp.org/ftp/tsg_ran/WG1_RL1/TSGR1_51b/Docs/R1-080065.zip>, Jan. 9, 2008.
NTT DoCoMo et al., "Hopping and Planning of Sequence Groups for Uplink RS", 3GPP R1-074804, Nov. 9, 2007.
Qualcomm Europe, "Hopping of UL DM-RS", 3GPP R1-080963, Feb. 15, 2008.
Qualcomm Europe,"Hopping of UL DM-RS and Other Details", 3GPP R1-080468, Jan. 18,2008.
Samsung, "Cyclic Shift Hopping of UL ACK Channels", 3GPP R1-073149, Jun. 29, 2007.
Qualcomm Europe, "Details on Scrambling", 3GPPTSG-RAN WG1#50b, R1-074429, Oct. 8-12, 2007, Shanghai, P. R. China, URL: http://www.3gpp.org/ftp/tsg_ran/WG1_RL1/TSGR1_50b/Docs/R1-074429.zip.
Qualcomm Europe: "Specification details for PRS sequences", 3GPP Draft, R1-080466, 3rd Generation Partnership Project (3GPP), Mobile Competence Centre, 650, Route Des Lucioles, F-06921 Sophia-Antipolis Cedex , France, vol. RAN WGl, no. Sevilla, Spain, Jan. 9, 2008, XP050108984, [retrieved on Jan. 9, 2008].
Qualcomm Europe, "Specification details for PRS sequences", 3GPP TSG-RAN WG1#52, R1-080640, Jan. 9, 2008, Sorrento, Italy, URL: http://www.3gpp.org/ftp/tsg_ran/WG1_RL1/TSGR1_52/Docs/R1-080640.zip.
Samsung: "Implicit resource allocation for uplink ACK/NACK signaling", 3GPP TSG RAN WG1 #49, R1-072227, Kobe, Japan, May 7-11, 2007.
Taiwan Search Report—TW098101282—TIPO—Aug. 28, 2013.

* cited by examiner

RESOURCE ALLOCATION RANDOMIZATION

CROSS-REFERENCE

This application claims priority to U.S. Application No. 61/021,005 entitled "Methods and apparatuses for resource allocation randomization", which was filed on Jan. 14, 2008. The entirety of which is herein incorporated by reference.

BACKGROUND

1. Field

The following description relates generally to wireless communication and in particular to using randomization to allocate sequence resources.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple (NT) transmit antennas and multiple (NR) receive antennas for data transmission. A MIMO channel formed by the NT transmit and NR receive antennas can be decomposed into NS independent channels, which can be referred to as spatial channels. Each of the NS independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region. However, conventional techniques can provide limited or no feedback related to channel information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, there can be a method for allocating a sequence resource through randomization that is operable upon a wireless communication device. The method can include producing a cyclic shift offset for use in random assignment of the sequence resource to a mobile device performed by a first module executable upon the wireless communication device. The method can also include assigning a sequence resource randomly through implementation of the produced cyclic shift offset performed by a second module executable upon the wireless communication device.

With another aspect, there can be an apparatus the uses a generator that produces a cyclic shift offset for use in random assignment of a sequence resource to a mobile device. The apparatus can also use an assigner that designates a sequence resource randomly through implementation of the generated cyclic shift offset.

In a further aspect, there can be at least one processor configured to allocate a sequence resource through randomization. The processor can include a first module for producing a cyclic shift offset for use in random assignment of the sequence resource to a mobile device. Moreover, the processor can include a second module for assigning a sequence resource randomly through implementation of the produced cyclic shift offset.

Concerning another aspect, there can be a computer program produce that incorporates a computer-readable medium. The medium can include a first set of codes for causing a computer to produce a cyclic shift offset for use in random assignment of a sequence resource to a mobile device. Also, the medium can include a second set of codes for causing the computer to assign a sequence resource randomly through implementation of the produced cyclic shift offset.

Through yet a further aspect, there can be an apparatus with means for producing a cyclic shift offset for use in random assignment of a sequence resource to a mobile device as well as means for assigning a sequence resource randomly through implementation of the produced cyclic shift offset.

In one aspect, there can be a method for using a resource, the method is operable upon a wireless communication device. The method can incorporate evaluating a sequence resource instruction on a sequence resource assigned for use, the sequence resource is assigned through implementation of a generated cyclic shift offset, the evaluating is performed by a first module executable upon the wireless communication device. The method can also incorporate identifying a sequence resource to use based upon a result of the evaluation performed by a second module executable upon the wireless communication device.

With another aspect, there can be an apparatus with an analyzer that evaluates a sequence resource instruction on a sequence resource assigned for use, the sequence resource is assigned through implementation of a generated cyclic shift offset as well as a selector that identifies a sequence resource to use based upon a result of the evaluation.

In a further aspect there can be at least one processor configured to use a resource. The processor can function with at least two modules—a first module for evaluating a sequence resource instruction on a sequence resource assigned for use, the sequence resource is assigned through implementation of a generated cyclic shift offset and a second module for identifying a sequence resource to use based upon a result of the evaluation.

Concerning another aspect, there can be a computer program product with a computer-readable medium. The medium can include a first set of codes for causing a computer to evaluate a sequence resource instruction on a sequence resource assigned for use, the sequence resource is assigned through implementation of a generated cyclic shift offset. Also, the medium can include a second set of codes for causing the computer to identify a sequence resource to use based upon a result of the evaluation.

Through yet a further aspect, there can be an apparatus with means for evaluating a sequence resource instruction on a sequence resource assigned for use, the sequence resource is assigned through implementation of a generated cyclic shift offset as well as means for identifying a sequence resource to use based upon a result of the evaluation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
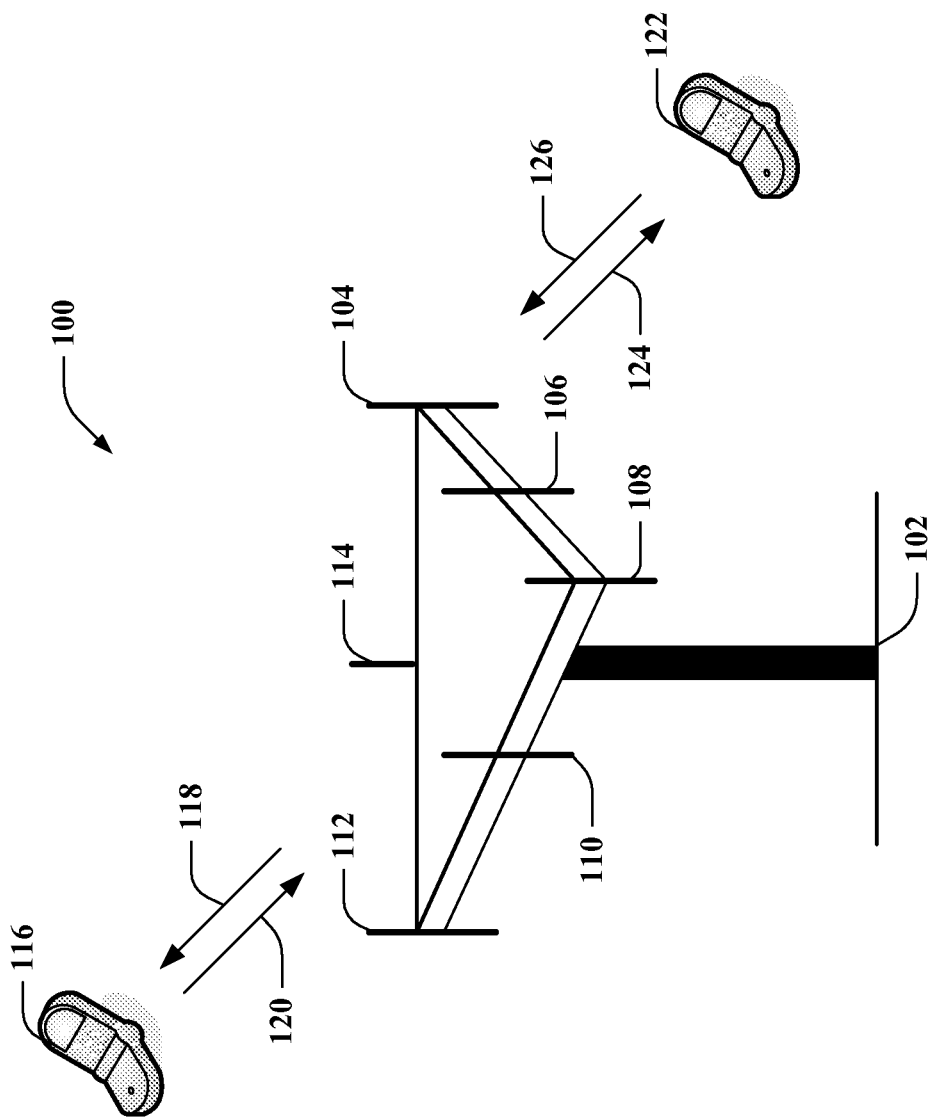
FIG. 1 illustrates a representative wireless communication system in accordance with at least one aspect disclosed herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used. It is to be appreciated that equations disclosed herein are examples that can be use in practicing various aspects and are not intended to limit of these aspects. For instance, aspects can be practiced with different equations than those disclosed.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. Metadata pertaining to an incoming communication (e.g., cellular call) can be displayed upon the mobile device. For instance, a number of minutes remaining on a 'pay as you go' telephone can be presented to a user.

As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
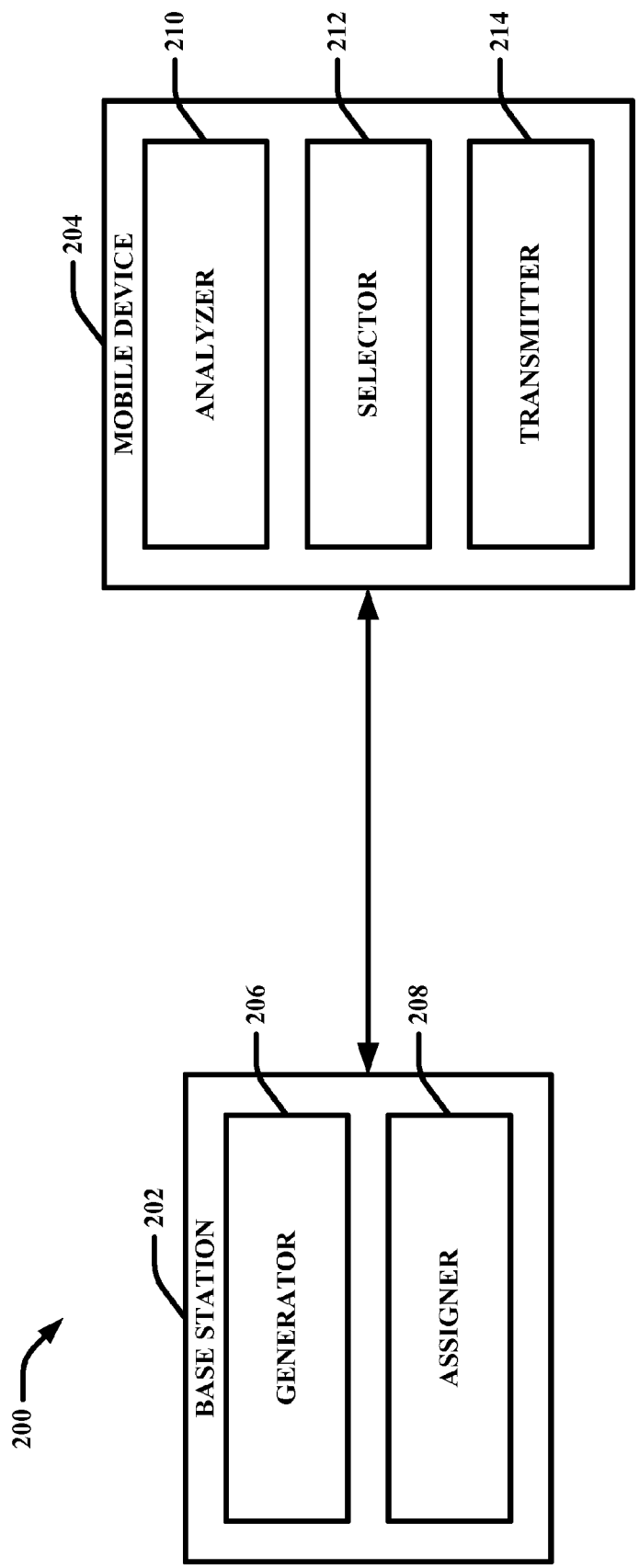
FIG. 2 illustrates a representative wireless communication system with a base station and detailed mobile device in accordance with at least one aspect disclosed herein.

Now referring to FIG. 2, an example system 200 is disclosed for performing operation in regard to randomly assigning a sequence resource to a mobile device. A sequence resource can be allocated in a manner to mitigate overall interference in communication between a base station 202 that supports a cell and a mobile device 204. For instance, in an 8-bit configuration, there can be eight different cyclic shifts used (01234567, 12345670, 23456701 . . . ). In the system 200, a mobile device 204 is assigned an independent sequence that is unique to the mobile device 204.

However, it is possible in a neighboring cell of another base station, a mobile device of the neighboring cell can also be assigned a sequence that matches the sequence of the mobile device 204. If the neighboring mobile device becomes too close to the cell of the base station 202, there can be interference (e.g., packets reach an incorrect destination, the base station 202 receives packets from the mobile device 204 and the neighboring mobile device, etc.). To assist in mitigation of interference, a cyclic shift offset can be randomly designated and used in determining a sequence for resource usage. The cyclic shift offset is the amount of change experienced by a sequence. For example, a cyclic shift offset of two can transfer an 8-bit sequence from 01234567 to 23456701 such that two bits are shifted.

A determination can be made that randomized sequence resource should occur or there can be automatic randomization (e.g., without making the determination, but performing upon identifying a communication instructing randomization). The base station 202 can employ a generator 206 that produces (e.g., automatically generates) a cyclic shift offset for use in random assignment of a sequence resource to a mobile device such that cyclic shifts used in the system 200 can be randomized. In one implementation, the produced cyclic shift offset is specific to a resource and performed on a per symbol basis. Based upon the cyclic shift offset produced, an assigner 208 can assign a sequence resource randomly through implementation of the generated cyclic shift offset and the assignment can be communicated to the mobile device 204.

The mobile device 204 can use an analyzer 210 that evaluates a sequence resource instruction on a sequence resource assigned for use (e.g., from the base station 202). The sequence resource can be assigned through implementation of a generated cyclic shift offset (e.g., from the assigner 208). A selector 212 can be used that identifies a sequence resource to use based upon a result of the evaluation. The mobile device 204 can used the assigned sequence resource and monitor for interference.

According to one embodiment, a determination can be made that a location of the mobile device 204 should become known to the base station 202 for use in resource assignment. For instance, a check can be performed if interference is likely with another mobile device and therefore location of the mobile device 204 should be evaluated. A transmitter 214 can obtain a request for location metadata, evaluate the request, and provide location metadata (e.g., to the base station 202)—additionally, the transmitter 214 can include a receiver portion that collects an instruction from the base station 202 on a sequence resource for use. According to one embodiment, at least a portion of the provided location metadata is used to determine a manner of cyclic shift offset generation (e.g., coordinated, uncoordinated, etc.).

The mobile device 204 can operate according to different situations. For instance, generation of the cyclic shift offset can be coordinated where a pseudo-random sequence and a deterministic sequence are added together and a result of the addition is an offset used to generate the cyclic shift offset. This can take place when the mobile device 204 is likely to interfere with a supplemental mobile device using another base station.

In an alternative embodiment, coordinated cyclic shift offset generation occurs upon processing of an interference notification. For instance, the base station 202 can perform automatically in an uncoordinated manner. The mobile device 204 can monitor operation to determine if there is interference—upon determining that there is interference the mobile device 204 can send a notification to the base station 202. The base station 202 can process the notification and perform coordinated cyclic shift offset generation.

The generation of the cyclic shift offset can also be uncoordinated where the cyclic shift offset can be generated through use of a scrambled output of a sequence generator. This can take place when the mobile device 204 is not likely to interfere with a mobile device using another base station. Moreover, the generated cyclic shift offset can be specific to a resource and performed on a per symbol basis. It is possible for generation of the cyclic shift offset to occur upon identifying communication is of a physical uplink control channel.

Production of a cyclic shift offset (e.g., cyclic shift offset hopping) can be used in a limited manner. For instance, a determination can be made on if there is PUSCH (Physical Uplink Shared Channel) or PUCCH (Physical Uplink Control Channel). If there is PUSCH then there can be no production (e.g., cyclic shift offset is explicitly signaled in an assignment, set to a static value conveyed by another level, etc.).

If communication is with PUCCH, then a cyclic shift offset can be produced. With inter-cell interference randomization, a cell specific cyclic shift offset sequence can be used. In one configuration, for cell specific cyclic shift application purposes, RS (reference signal) and control symbols within the PUCCH are not distinguished. In can be the cyclic shift offset in symbol i where it is possible:
$l_i \in \{0, 1, 2, \ldots, 11\}$ If the cyclic shift in a symbol is $u_i$ before applying the cell specific cyclic shift offset then the symbol can be $(l_i+u_i) \bmod 12$ after applying the cell specific cyclic shift offset. There can be at least two options for generating the $l_i$ (e.g., coordinated and uncoordinated). Thus, there can be mitigation of interference by randomizing cyclic shifts as well as randomizing PUSCH reference signal sequence resource allocations and PUCCH sequence resource allocation.

Figure 3:
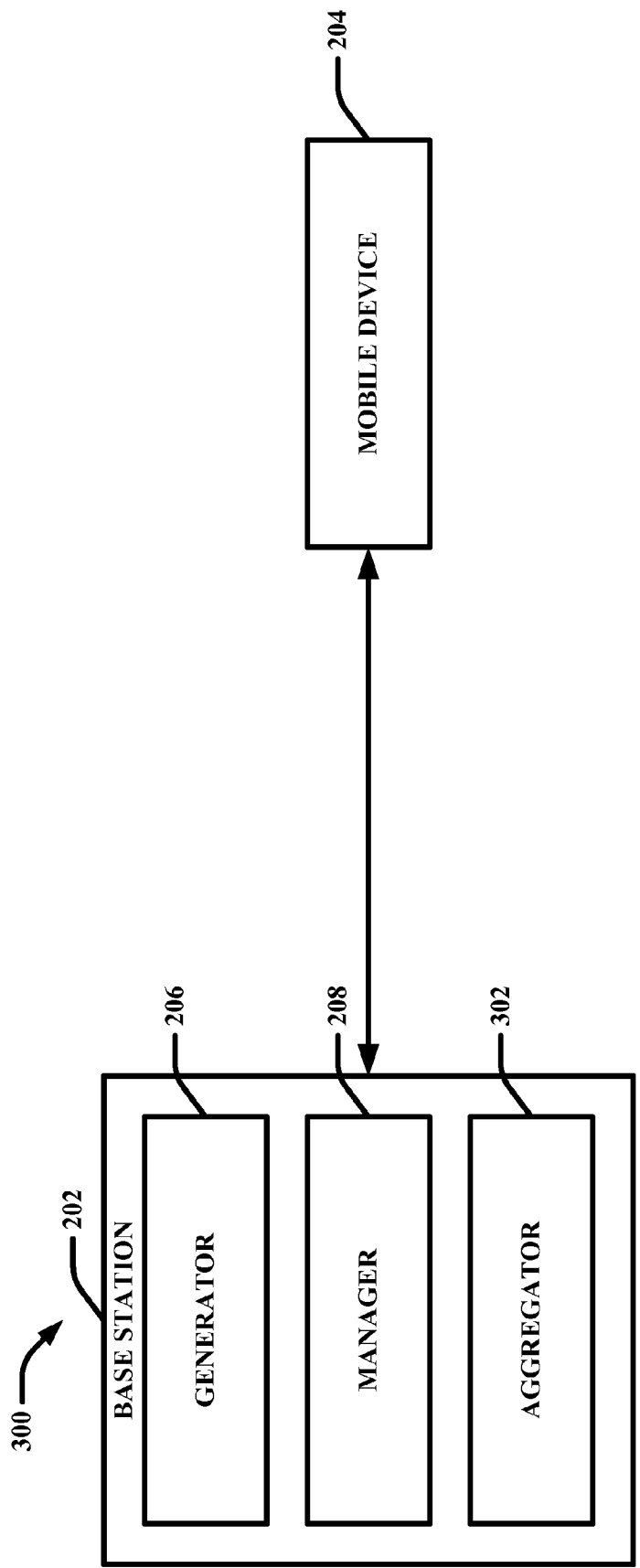
FIG. 3 illustrates a representative wireless communication system with a detailed base station operating in a coordinated manner and mobile device in accordance with at least one aspect disclosed herein.

Referring to FIG. 3, an example system 300 is disclosed for resource allocation in a coordinated manner. A base station 202 can use a generator 206 and an assigner 208 to engage with a mobile device 204. When assigning a sequence resource to the mobile device 204, the sequence resource can be exclusive to the mobile device 204 within a cell of the base station 202.

Therefore, production of the cyclic shift offset can be performed in a coordinated manner (e.g., a level of coordination among nearby base stations) to minimize interference. An aggregator 302 can be employed that adds together a pseudo-random sequence (e.g., dependent upon a group identifier, which can be a SSC_ID (secondary synchronization code identification)) and a deterministic sequence (e.g., dependent upon an intra-group index, which can be a PSC_ID (primary synchronization code identification)), a result of the addition is an offset (e.g., used to produce cyclic shift offset). Thus, there could be a minimization to cyclic shift alignments in cells with matching group identifiers.

There can be a pseudorandom cyclic shift offset, $t_i$, that can be determined by through scrambling sequence generator output. The sequence generator can be initialized at a subframe boundary (e.g., every subframe boundary) and clocked once in a symbol (e.g., once every symbol). For instance, a 33-bit seed sequence can be constructed according to: initial bit $b_{32} \ldots b_{30}$ has value 0,0,0; initial bit $b_{29} \ldots b_{27}$ has value 0,1,1; initial bit $b_{26} \ldots b_{13}$ has value 0,0 . . . ,0; initial bit $b_{12} \ldots b_9$ has value equal to that of a subframe identification; and initial bit $b_8 \ldots b_0$ has value equal to the group identifier. The subframe ID can be part of the initialization bits and thus a resulting sequence period could be one frame (e.g., 10 ms). A scrambling generator can have an output of $s_0, s_1, \ldots, s_{8 \cdot v}$, where v is the number of symbols per frame and the cell specific cyclic shift offset $t_i$ in symbol i can be determined as:

$$t_i = \left(\sum_{b=0}^{7} s_{8 \cdot i + b} \cdot 2^b\right) \bmod 12$$

Thus, there can be taking of consecutive bytes of the scrambling sequence, one for each symbol and take the corresponding integer value modulo 12. The intra-group index dependent deterministic cyclic shift offset value $r_j$, $0 \le j \le 12$ could be defined as $$(r_0, r_1, \ldots, r_{11}) = \begin{cases} (0, 0, 0, 0, 0, 0, 0, 0, 0, 0, 0, 0) & \text{if intra-group index} = 0 \\ (0, 1, 3, 7, 2, 5, 11, 10, 8, 4, 9, 6) & \text{if intra-group index} = 1 \\ (0, 12, 10, 6, 11, 8, 2, 3, 5, 9, 4, 7) & \text{if intra-group index} = 2 \end{cases}$$

Figure 4:
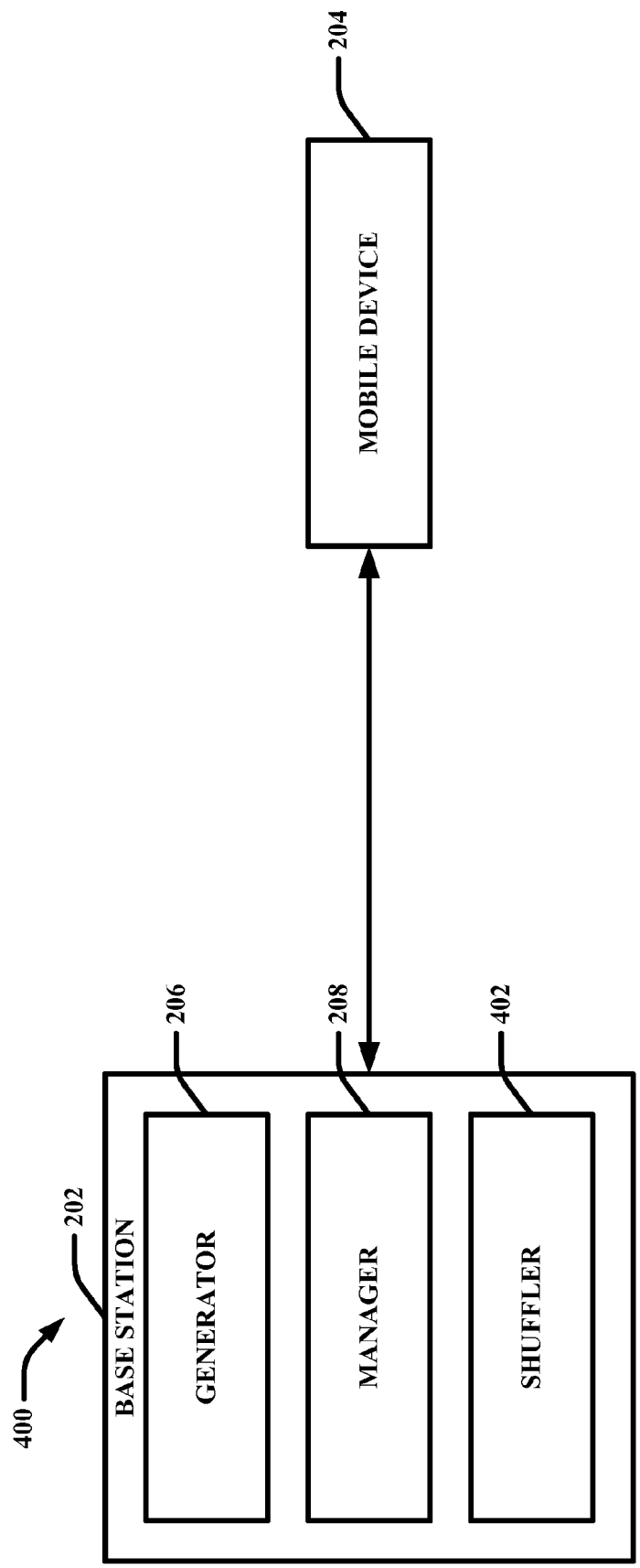
FIG. 4 illustrates a representative wireless communication system with a detailed base station operating in an uncoordinated manner and mobile device in accordance with at least one aspect disclosed herein.

A single formula can exist for generating the aforementioned sequences. The sum of $r_j$ for intra-group index=1 and for intra-group index=2 could be zero modulo 13. For any pair of intra-group indices, the element-wise shift differences could be distinct. The cell specific cyclic shift offset $l_i$ in symbol i could be determined as:
$l_i = (t_i + r_{i \bmod 6}) \bmod 12$ Now referring to FIG. 4, an example system 400 is disclosed for resource allocation in an uncoordinated manner. A base station 202 can use a generator 206 and an assigner 208 to engage with a mobile device 204 and provide a sequence resource indication for use by the mobile device 204. It is possible for randomization to occur in an uncoordinated manner (e.g., completely randomized). If it is determined that there should be uncoordinated cyclic shift offset production, then a shuffler 402 can be employed that scrambles an output of a sequence generator (e.g., the scrambled output is an offset used to produce the cyclic shift offset).

According to one embodiment, a cyclic shift offset pattern can be used that is dependent on cell identification. The sequence generator can be initialized at a subframe boundary (e.g., every subframe boundary) and clocked once in a symbol (e.g., once every symbol). For instance, a 33-bit seed sequence can be constructed according to: initial bit $b_{32} \ldots b_{30}$ has value 0,0,0; initial bit $b_{29} \ldots b_{27}$ has value 0,1,0; initial bit $b_{26} \ldots b_{13}$ has value 0,0 . . . ,0; initial bit $b_{12} \ldots b_9$ has value equal to that of a subframe identification; and initial bit $b_8 \ldots b_0$ has value equal to the Cell_ID (Cell Identification). The subframe ID can be part of the initialization bits and thus a resulting sequence period could be one frame (e.g., 10 ms). A scrambling generator can have an output of $s_0, s_1, \ldots, s_{8 \cdot v}$ where v is the number of symbols per frame and the cell specific cyclic shift offset $t_i$ in symbol i can be determined as:

$$t_i = \left(\sum_{b=0}^{7} s_{8 \cdot i + b} \cdot 2^b\right) \bmod 12$$

Thus, there can be taking of consecutive bytes of the scrambling sequence, one for each symbol and take the corresponding integer value modulo 12.

Figure 5:
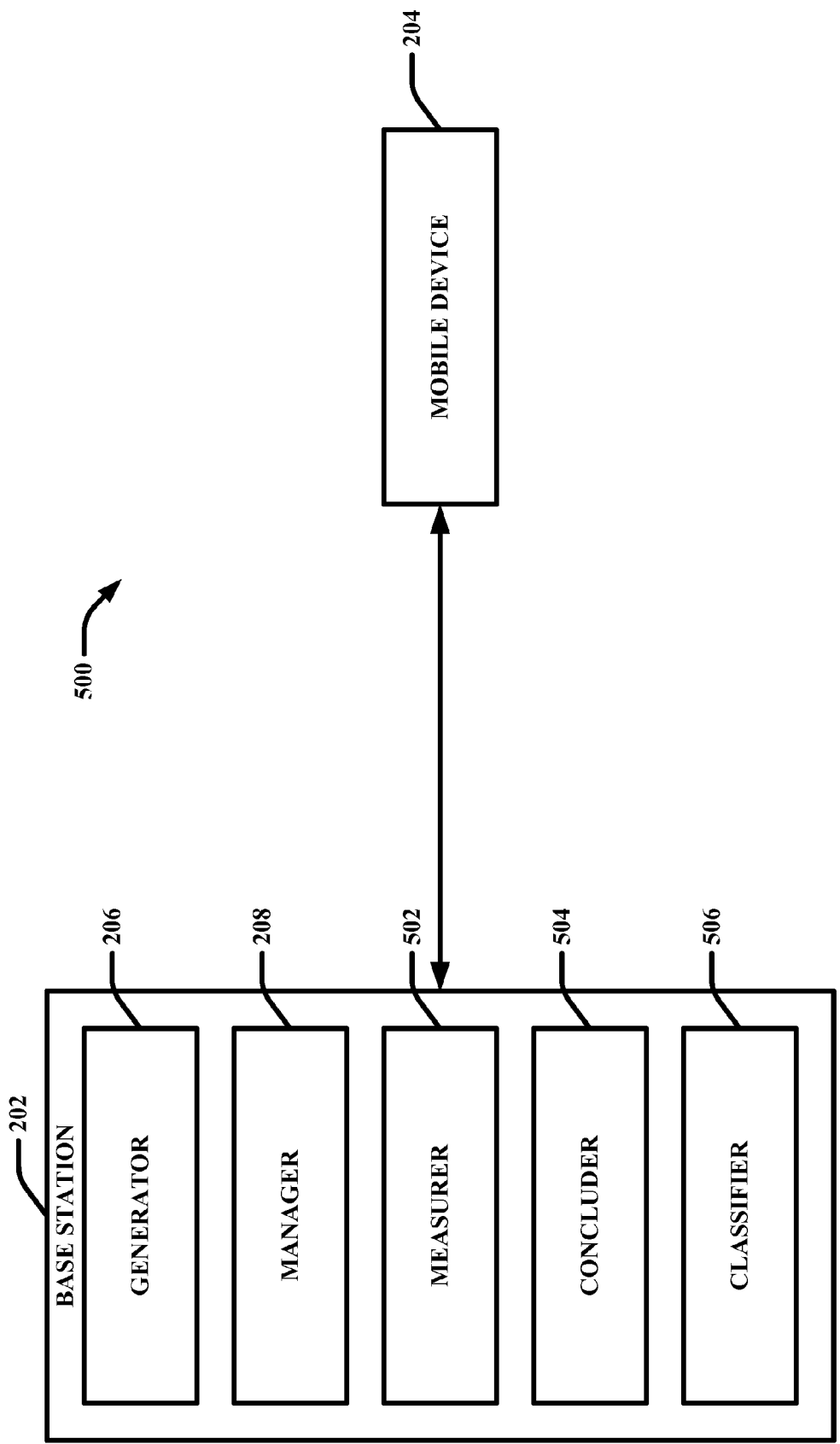
FIG. 5 illustrates a representative wireless communication system with a detailed base station that evaluates a communication network and mobile device in accordance with at least one aspect disclosed herein.

Now referring to FIG. 5, an example system 500 is disclosed for randomly determining a sequence resource to be used by a mobile device 204. A base station 202 can use a generator 206 and an assigner 208 to engage with the mobile device 204 and provide a sequence resource indication for use by the mobile device 204. While operation in a coordinated or uncoordinated manner can be universal, in one implementation a determination can be made on which manner to use.

A measurer 502 can be used that determines a distance among at least two base stations. The determined distance can be accessed by a concluder 504 that infers if the distance is such that interference is expected between at least one mobile device associated with each base station. There can be a determination on if the cyclic shift offset should be coordinated or uncoordinated is based upon a result of the inference. A classifier 506 can be employed for making the determination if the cyclic shift offset should be coordinated or uncoordinated (e.g., based upon a result of the inference of the concluder 504). According to an alternative embodiment, the measurer 502, concluder 504, and/or classifier 506 can function regarding distances between mobile devices or distances between mobile devices and base stations as opposed to distances between base stations.

It is to be appreciated that artificial intelligence techniques can be used to practice determinations and inferences disclosed herein. These techniques employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. These techniques can also include methods for capture of logical relationships such as theorem provers or more heuristic rule-based expert systems. These techniques can be represented as an externally pluggable module, in some cases designed by a disparate (third) party.

Figure 6:
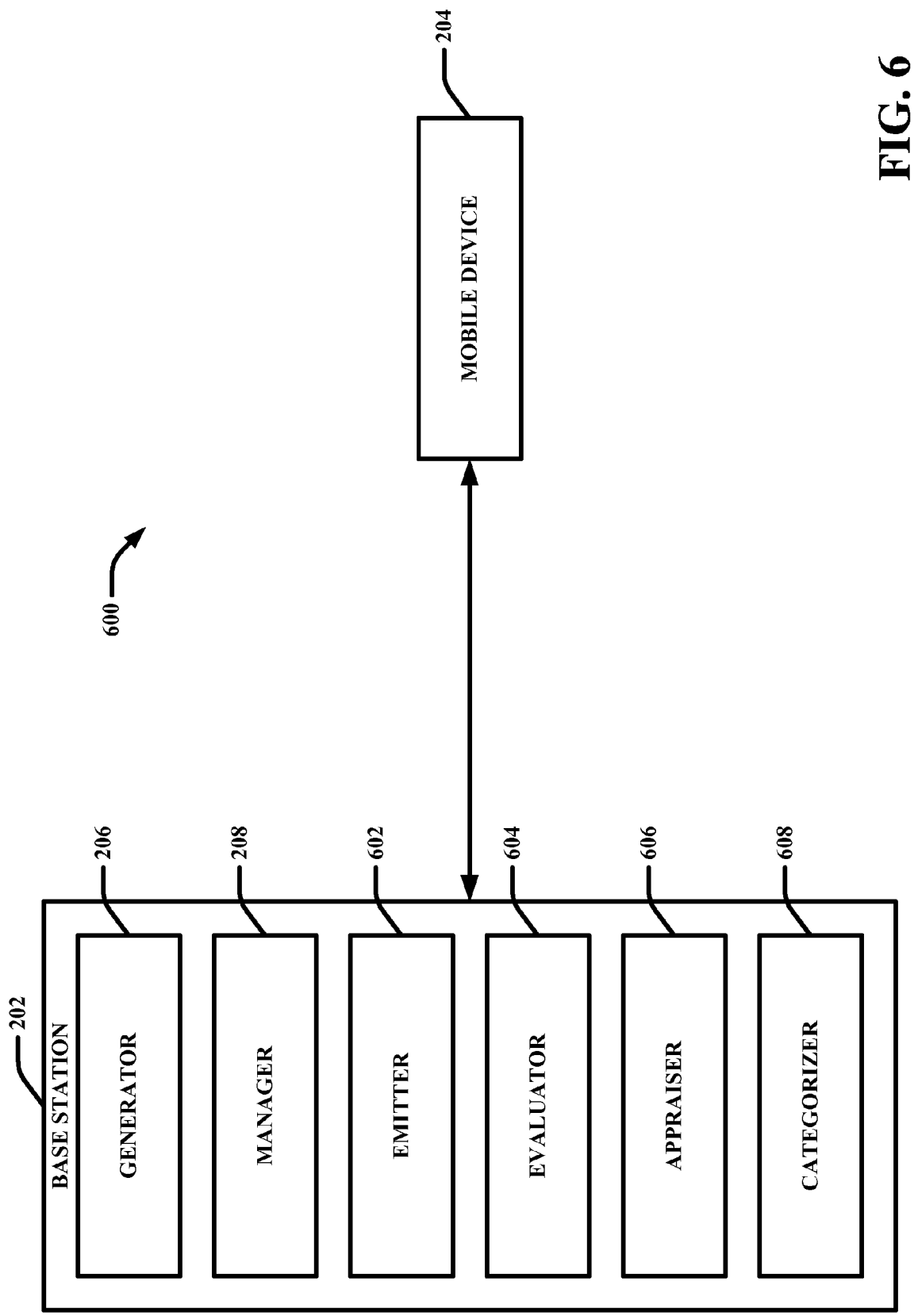
FIG. 6 illustrates a representative wireless communication system with a detailed base station that evaluates a contextual situation and mobile device in accordance with at least one aspect disclosed herein.

Now referring to FIG. 6, an example system 600 is disclosed for randomly determining a sequence resource to be used by a mobile device 204. A base station 202 can use a generator 206 and an assigner 208 to engage with the mobile device 204 and provide a sequence resource indication for use by the mobile device 204. When a sequence resource assignment is determined, an emitter 602 can notify the mobile device 204 of the assigned sequence resource.

An evaluator 604 can identify communication (e.g., uplink communication of the mobile device) is of a physical uplink control channel. Production of the cyclic shift offset can occur upon performing the identification. To save power resources, improver processing time, and the like, the base station 202 can operate in limited instances. In one embodiment, the base station provides a resource allocation when a mobile device 204 makes a valid request for resource allocation. An appraiser 606 can identify a request to perform resource allocation (e.g., originating from the mobile device 204, automatically originating, etc.). A categorizer 608 can be employed that determines that a cyclic shift offset should be used upon identifying the request and production of the cyclic shift offset can occur upon a positive determination.

Figure 7:
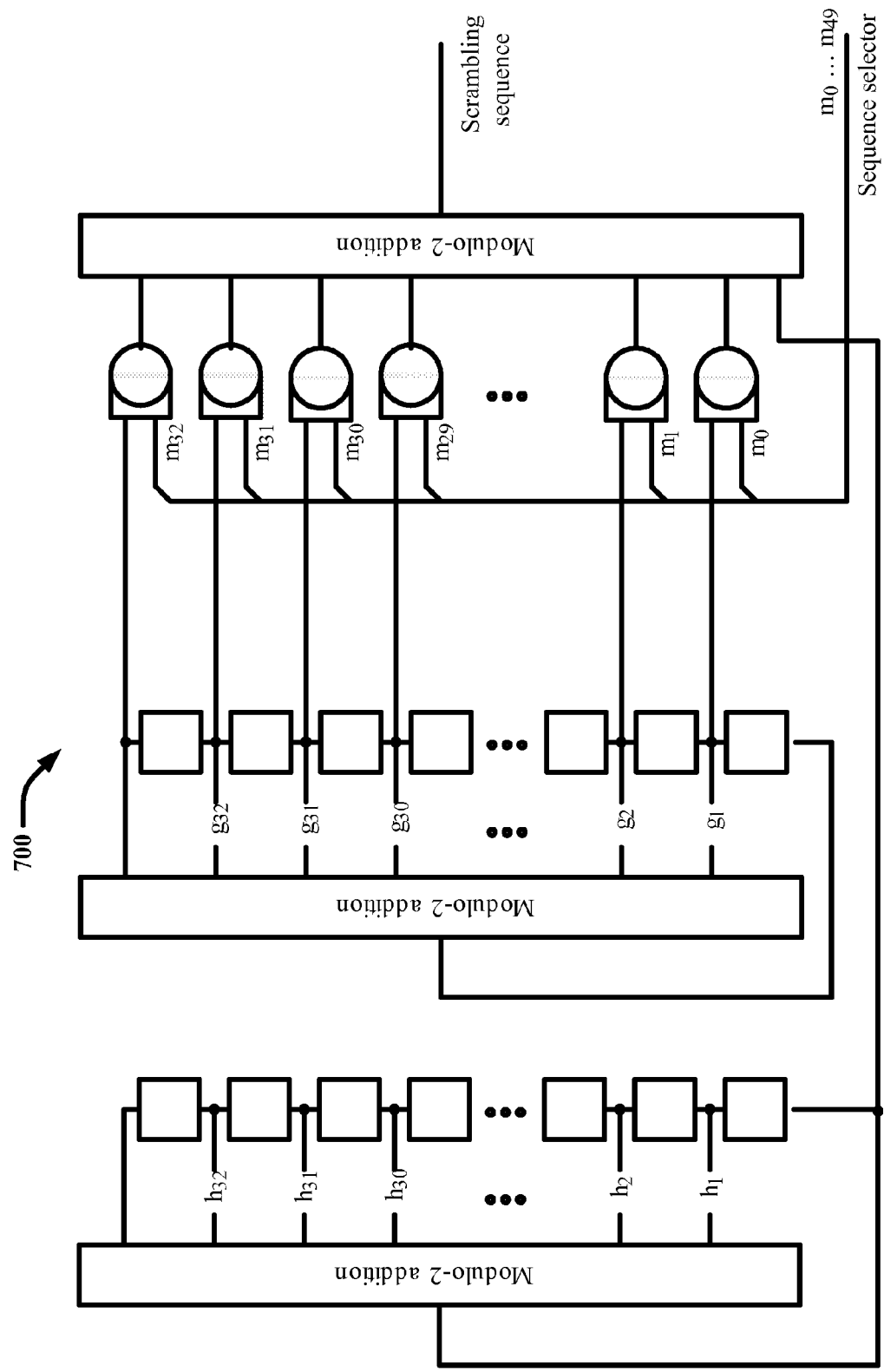
FIG. 7 illustrates a representative random sequence generator in accordance with at least one aspect disclosed herein.

Now referring to FIG. 7, an example pseudorandom sequence generator 700 is disclosed that can be used in accordance with at least one aspect disclosed herein (e.g., employed by the base station 202 of FIG. 2). A pseudorandom sequence can be used in sequence hopping pattern generation. The generator 700 could be used to generate all pseudorandom sequences as well as a portion of sequences.

Arithmetic can be used to compute Physical Uplink Control Channel (PUCCH) and Physical Uplink Shared Channel (PUSCH) allocation parameters in a symbol (e.g., every symbol). Moreover, there can be Flexible PUCCH cyclic shift and orthogonal cover allocation. Also, a hopping pattern can be independent of an overall allocation strategy. A mobile device can be limited in being aware of its own initial parameter set—for instance, the mobile device could not be provided information on what strategy is used to optimize the cyclic shift and orthogonal cover allocation (e.g., a base station does not disclose to a mobile device if coordinated or uncoordinated operation is used to produce the cyclic shift offset). Additionally, a single set of rules for cell specific hopping or a resource specific hopping case can be used. For PUCCH and PUSCH, a set of possible RS (reference signal) sequences denoted by their sequence index can be defined for possible RB (sequence resource) allocation cases. In the case of the PUCCH, a same set of sequences can also used to convey control information. In one implementation, there can be a single downlink (DL) signaling of bit informing to user equipment (UE) about whether sequence hopping should be used or not.

In one implementation, there can be a disablement of sequence hopping. In a case with PUSCH, the UE can use the PUSCH RS sequence index(es) corresponding to a signaled sequence group. In one case (e.g., a number of sequence resources being below or equal to 5), the UE can use a single sequence index (e.g., one of 30). In another case (e.g., a number of sequence resources being above 5), the UE can use a first sequence index in the signaled sequence group in a first slot of a subframe and use a second sequence index in a signaled sequence group in a second slot of the subframe. Therefore, the UE can alternate between the two sequences defined for the sequence group. If it is desired to have more sequences (e.g., more than two) per sequence group for a number of sequence resources greater than five, then the UE can cycle through sequence indices in a similar fashion. If there are m indices per sequence group, (e.g., the set of indexes is $\{k_0, k_1, \ldots, k_{m-1}\}$ in a given sequence group) then in the $i^{th}$ slot of a frame, the UE could use the sequence with index $k_{i \bmod m}$. In a first slot of a frame, $k_0$ could be always used. In a case with PUCCH the UE uses a single sequence based on the signaled sequence group for both the RS and the control data modulation.

Likewise, there can be an enabling of sequence hopping. With PUSCH, the UE can use the PUSCH RS sequence index determined by a scrambling sequence generator output.). For instance, a 33-bit seed sequence can be constructed according to: initial bit $b_{32} \ldots b_{30}$ has value 0,0,0; initial bit $b_{29} \ldots b_{27}$ has value 0,0,1; initial bit $b_{26} \ldots b_{13}$ has value 0,0 …,0; initial bit $b_{12} \ldots b_9$ has value equal to that of a subframe identification; and initial bit $b_8 \ldots b_0$ has value equal to the Cell_ID (Cell Identification). The subframe ID can be part of the initialization bits and thus a resulting sequence period could be one frame (e.g., 10 ms). A scrambling generator can have an output of $s_0, s_1, \ldots, s_{8 \cdot u}$ where u is the number of slots per frame, then the PUSCH sequence index $k_i$ in slot i can be determined as:

$$k_i = \left( \sum_{l=0}^{7} s_{8 \cdot i + l} \cdot 2^l \right) \bmod(m \cdot 30)$$

(e.g., taking consecutive bytes of the scrambling sequence, one for each slot and take the corresponding integer value modulo the total number of sequence indices) where m can be the number of sequences indices per sequence group, such as:

$$m = \begin{cases} 1 & N_{RB} \leq 5 \\ 2 & N_{RB} > 5 \end{cases}$$

With PUCCH, the UE can use the PUCCH RS and control sequence index as determined by the scrambling sequence generator output. The sequence generator could be initialized at every subframe boundary and clocked once for every symbol. For instance, a 33-bit seed sequence can be constructed according to: initial bit $b_{32} \ldots b_{30}$ has value 0,0,0; initial bit $b_{29} \ldots b_{27}$ has value 0,0,1; initial bit $b_{26} \ldots b_{13}$ has value 0,0 …,0; initial bit $b_{12} \ldots b_9$ has value equal to that of a subframe identification; and initial bit $b_8 \ldots b_0$ has value equal to the Cell_ID (Cell Identification). The subframe ID can be part of the initialization bits and thus a resulting sequence period could be one frame (e.g., 10 ms).

If the scrambling generator output is $s_0, s_1, \ldots, s_{8 \cdot v}$ where v is a number of symbols per frame, then the PUCCH CGS (Computer Generated Sequence) sequence index $k_i$ in symbol i can be determined as:

$$k_i = \left( \sum_{l=0}^{7} s_{8 \cdot i + l} \cdot 2^l \right) \bmod 30$$

It is possible that for the sequence index generation purposes, the RS and control symbols within the PUCCH are not distinguished.

There can be PUCCH resource specific cyclic shift hopping. Resource specific cyclic shift hopping can performed on a per symbol basis. For instance, a hopping pattern can be based on a factor 3 decimation. A resource specific cyclic shift $c_j$ in control data symbol j can determined as:

$$c_j = 2 \cdot ((\lfloor c_0/2 \rfloor + 1) \cdot 3^{j + c_0 \bmod 2}) \bmod 7 + c_0 \bmod 2$$

In one implementation, there can be a first symbol of every frame, j=0. After that, j can be incremented by one for every control symbol but not incremented for RS symbols. The resource specific cyclic shift $c_k$ in RS symbol k can determined as:

$$c_k = 2 \cdot ((\lfloor c_0/2 \rfloor + 1) \cdot 3^{k + c_0 \bmod 2}) \bmod 7 + c_0 \bmod 2$$

In one implementation, there can be a first RS symbol of every frame, k=0. After that, k can be incremented by one for every RS symbol but not incremented for control data symbols.

According to one embodiment, there can be PUCCH resource hopping. At a slot boundary (e.g., every slot boundary), cyclic shift allocation can be offset according to a deterministic pattern. Thus there can be a maximization of distance in a new slot between resources that were sharing the same cyclic shift resource in a previous slot. Resource hopping can be achieved by adding a slot and resource dependent cyclic shift offset $d_i^j$ for slot i and orthogonal cover index j. The cyclic shift offset $d_i^j$ for slot i and orthogonal cover index j can be determined as:

$$d_i^j = \begin{cases} 0 & \text{if } j = 0 \\ (2 \cdot i \cdot (j+1)) \bmod 12 & \text{if } j > 0 \end{cases}$$

An orthogonal cover index j can be mapped to spreading sequences as:

$$\begin{cases} j = 0 & +1+1+1+1 \\ j = 1 & +1-1+1-1 \\ j = 2 & +1+1-1-1 \\ j = 3 & +1-1-1+1 \end{cases}$$

There can also be PUCCH RS resource hopping—the cyclic shift offset $d_i^j$ for slot i and orthogonal cover index j can be determined as:

$$d_i^j = (4 \cdot i \cdot j) \bmod 12$$

The orthogonal cover index j can be mapped to spreading sequences as:

$$\begin{cases} j = 0 & 1 & 1 & 1 \\ j = 1 & 1 & e^{i \cdot 2\pi/3} & e^{-i \cdot 2\pi/3} \\ j = 2 & 1 & e^{-i \cdot 2\pi/3} & e^{i \cdot 2\pi/3} \end{cases}$$

There can be orthogonal cover hopping—an orthogonal cover can be changed at a slot boundary (e.g., at every slot boundary). A relationship between orthogonal cover functions that are associated with a pair of PUCCH resources can be the same across slot boundaries; however, a cell dependent linear offset can be applied to each orthogonal cover function. The offset can indicate that a cell specific cover function is added (e.g., element-wise multiply) to each orthogonal cover function used in a cell. This can preserve optimum distribution of orthogonal covers that could be used.

The cell specific orthogonal cover offset index can be determined by a scrambling sequence generator output. The sequence generator can initialize at a subframe boundary (e.g., every subframe boundary) and clocked once in every slot. For instance, a 33-bit seed sequence can be constructed according to: initial bit $b_{32} \ldots b_{30}$ has value 0,0,0; initial bit $b_{29} \ldots b_{27}$ has value 1,0,0; initial bit $b_{26} \ldots b_{13}$ has value 0,0 . . . ,0; initial bit $b_{12} \ldots b_9$ has value equal to that of a subframe identification; and initial bit $b_8 \ldots b_0$ has value equal to the Cell_ID (Cell Identification). The subframe ID can be part of the initialization bits and thus a resulting sequence period could be one frame (e.g., 10 ms). If a scrambling generator output is $s_0, s_1, \ldots, s_{8 \cdot u}$ where u is the number of slots per frame, then the cell specific orthogonal cover offset index $d_i$ for the ACK (acknowledgement) data in slot i can be determined as:

$$d_i = \left(\sum_{b=0}^{7} s_{8 \cdot i+b} \cdot 2^b\right) \mod 4$$

While the cell specific orthogonal cover offset index $e_i$ for the RS in slot i can be determined as:

$$e_i = \left(\sum_{b=0}^{7} s_{8 \cdot i+b} \cdot 2^b\right) \mod 3$$

An actual applied orthogonal cover can be a sum (e.g., element-wise product) of an initial assigned orthogonal cover and the orthogonal cover function indicated by d and $e_i$ for the ACK data and ACK RS, respectively.

Figure 8:
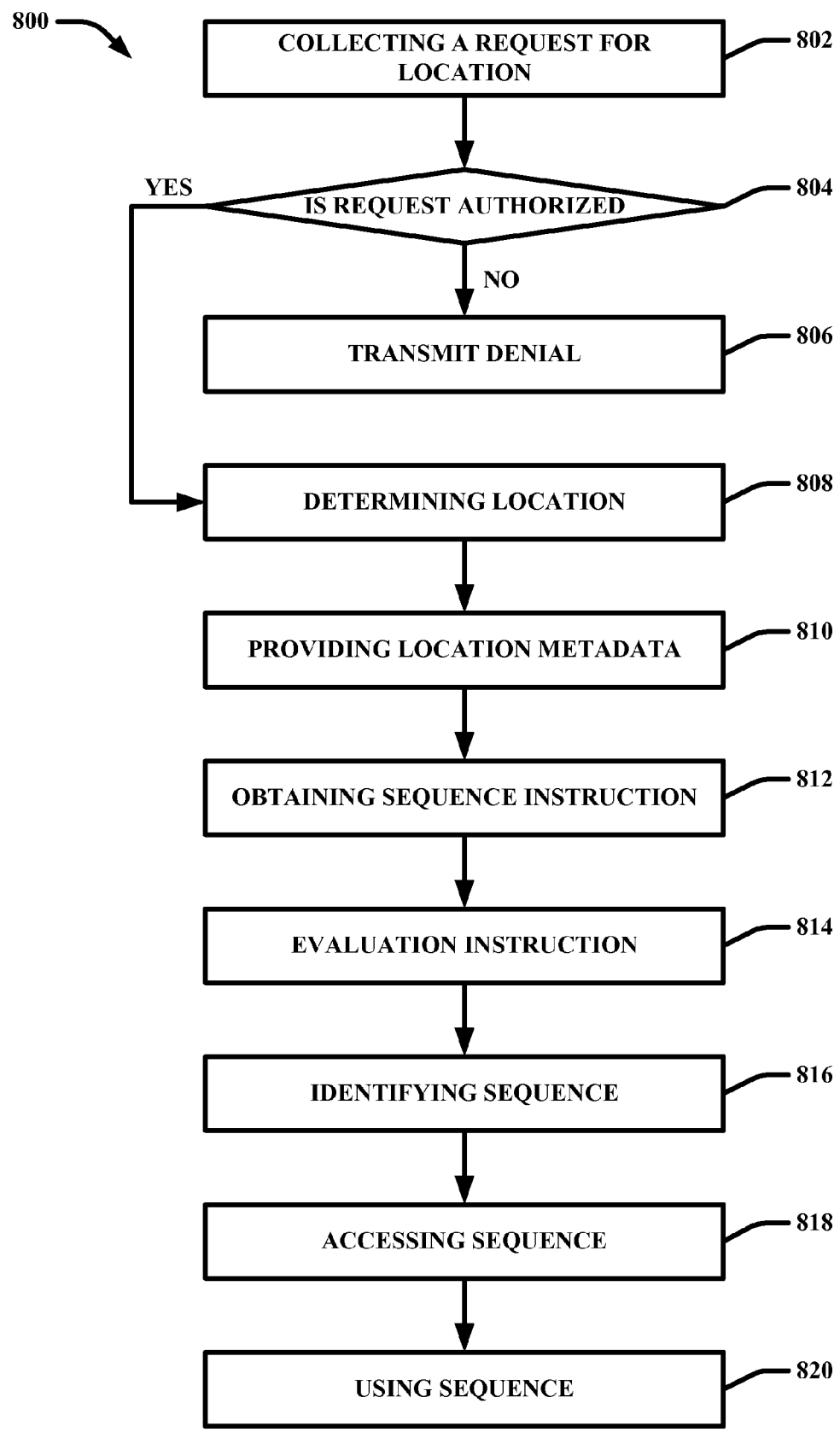
FIG. 8 illustrates a representative methodology for operation of a mobile device in accordance with at least one aspect disclosed herein.

Referring now to FIG. 8, an example methodology 800 is disclosed for operation of a mobile device concerning sequence resource allocation. A request for the mobile device to provide location information can be collected at event 802—commonly the request originates from a base station. The request can be a global request (e.g., transferred to all mobile devices within a base station cell) or specific (e.g., transferred individually to a base station). In an alternative implementation, a base station can track the mobile device without explicitly requesting the mobile device to provide location metadata.

The request can be evaluated and a check 804 can determine if the request is authorized. An authorized request can include that the base station (or intended destination of location information) is allowed to receive location information, the request is not out of date, etc. If the check 804 determines that the request is not authorized, then a denial can be transmitted at act 806—other responses are possible, such as ignoring the request.

However, if the request is authorized, then the mobile device can determine its location at event 808. In an alternative embodiment, the mobile device continuously monitors its location and thus the location is known when the request is collected. The location metadata can be provided to a destination designated by the request. A follow-up can occur to determine if the intended destination obtained the information (e.g., performed through communicating with the destination, making an inference if sequence resource instruction has not occurred recently, etc.).

The location metadata can be processed by a base station and used to determine a sequence resource to be used by the mobile device. The sequence resource assigned to the mobile device can be transferred to the mobile device through an instruction—the instruction can be obtained through event 812. An evaluation can occur to determine what sequence resource is assigned to the mobile device at action 814.

Based upon a result of the evaluation, a sequence resource for use by the mobile device can be identified through act 816. A check can occur to determine if the sequence resource can be used (e.g., portion is not used by another mobile device)—upon a positive determination there can be accessing of the sequence resource at event 818. The sequence resource designated for exploitation can be used through action 820.

Figure 9:
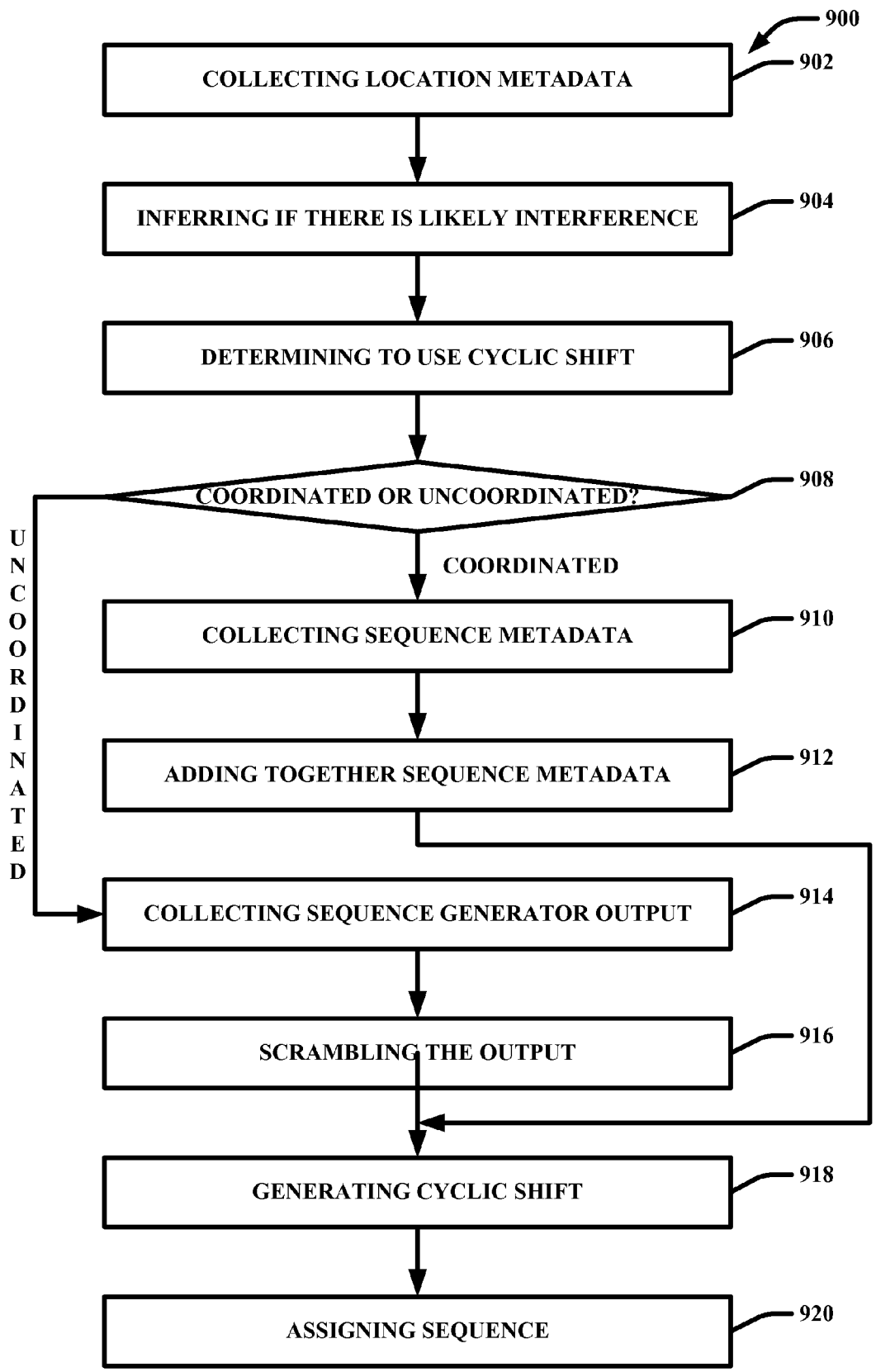
FIG. 9 illustrates a representative methodology for operation regarding cyclic shift in accordance with at least one aspect disclosed herein.

Referring now to FIG. 9, an example methodology 900 is disclosed for base station operation in relation to allocation of sequence resources to a mobile device. Metadata can be collected pertaining to a location of a mobile device or of a neighboring base station through action 902. An inference can be drawn at act 904 on if there is likely to be interference between a mobile device of the base station and another mobile device. A determination can be made at action 906 that a cyclic shift should be employed (e.g., based upon a result of the inference, evaluation of relevant metadata, and the like).

A check 908 can be performed to determine if there should be coordinated resource allocation or uncoordinated resource allocation. If it is determined that there should be coordinated allocation, then there can be collection of sequence metadata at act 910 and aggregating of at least part of the sequence data at event 912. If there is to be uncoordinated allocation, then sequence generator output can be collected at act 914 and scrambled at event 916. With a coordinated or uncoordinated operation, there can be generating cyclic shift offset at action 918 and assignment of a sequence resource at event 920—a notification identifying the assigned sequence resource can transfer to the mobile device.

Figure 10:
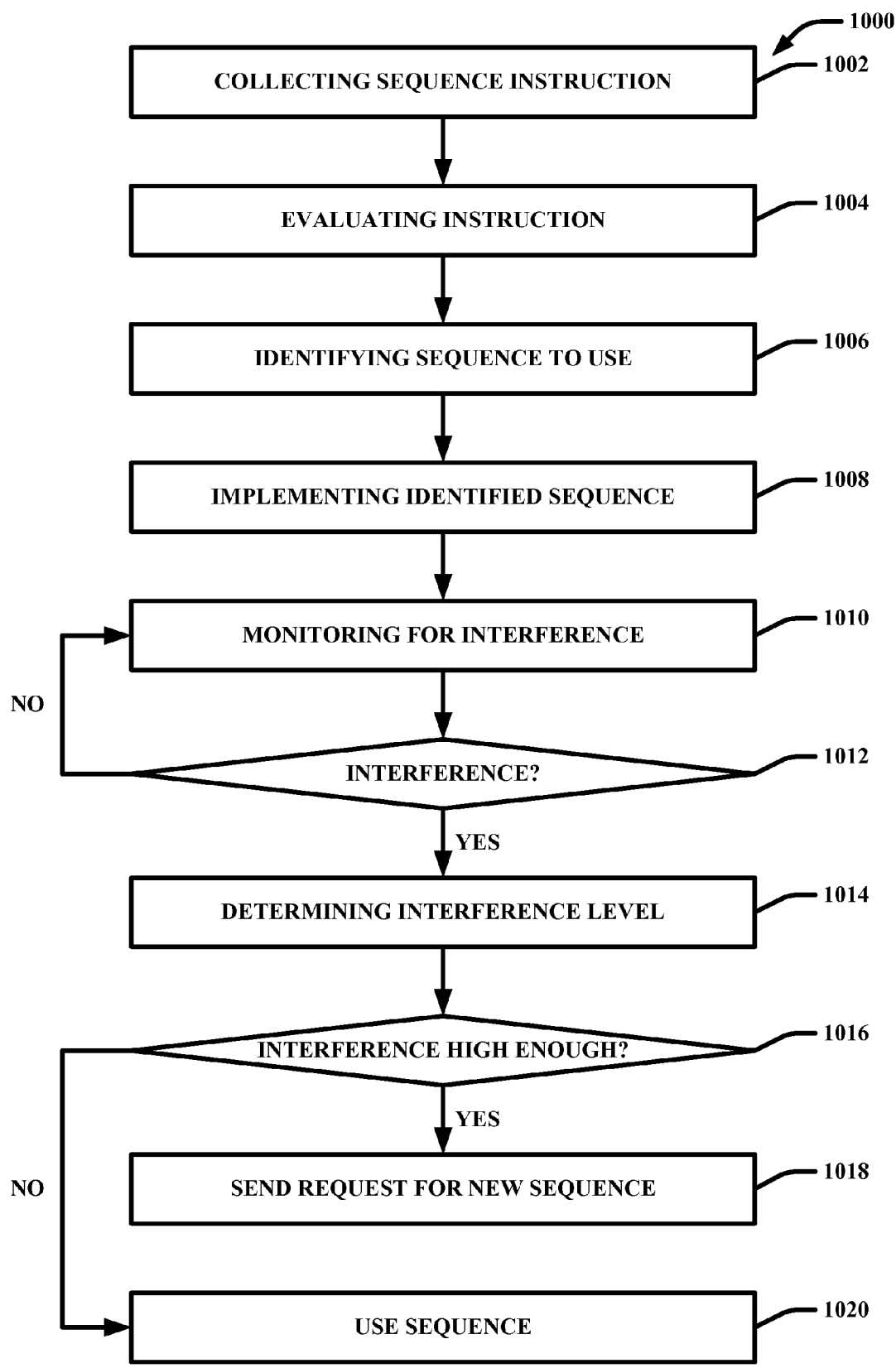
FIG. 10 illustrates a representative methodology mobile device monitoring in accordance with at least one aspect disclosed herein.

Referring now to FIG. 10, an example methodology 1000 is disclosed for mobile device operation regarding resource allocation. A sequence resource instruction can be collected at act 1002 and evaluated to determine which sequence resource to use at act 1004. A resource portion to use can be identified at event 1006 and implemented through action 1008.

Monitoring of operation can take place through event 1010—the monitoring can specifically determine if the mobile device is experiencing interference due to close proximity with another mobile device or base station. A check 1012 can take place to determine if there is interference—if there is not interference, then the methodology 1000 can return to event 1010. However, if there is interference, then a determination can be made at a level of the interference at act 1014, as well as a source of interference (e.g., general static, from having a nearby mobile device with a matching resource assignment, etc.).

A check 1016 can determine if interference is at a high enough level to warrant a request for a new sequence resource. If the interference is severe enough, then a request can be sent for a new sequence resource at act 1018. For instance, a base station could assign a sequence resource in an uncoordinated manner under a premise that there is no nearby entity that would also use the sequence resource. However, if the mobile device (e.g., through methodology 1000) determines that there is interference, then the base station can be notified and perform coordinated sequence resource allocation (e.g., coordinated with an interfering entity). If the interference is not substantial, then the sequence resource assigned can be used at action 1020—in one implementation, the methodology can return to event 1010 to monitor operation.

Referring to FIGS. 8-10, methodologies relating to operations regarding assigning of sequence resources are disclosed. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

It will be appreciated that, in accordance with one or more aspects described herein, inferences can be made regarding whether a cyclic shift should be used, a location of a mobile device, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. It will be appreciated that the foregoing examples are illustrative in nature and are not intended to limit the number of inferences that can be made or the manner in which such inferences are made in conjunction with the various embodiments and/or methods described herein.

Figure 11:
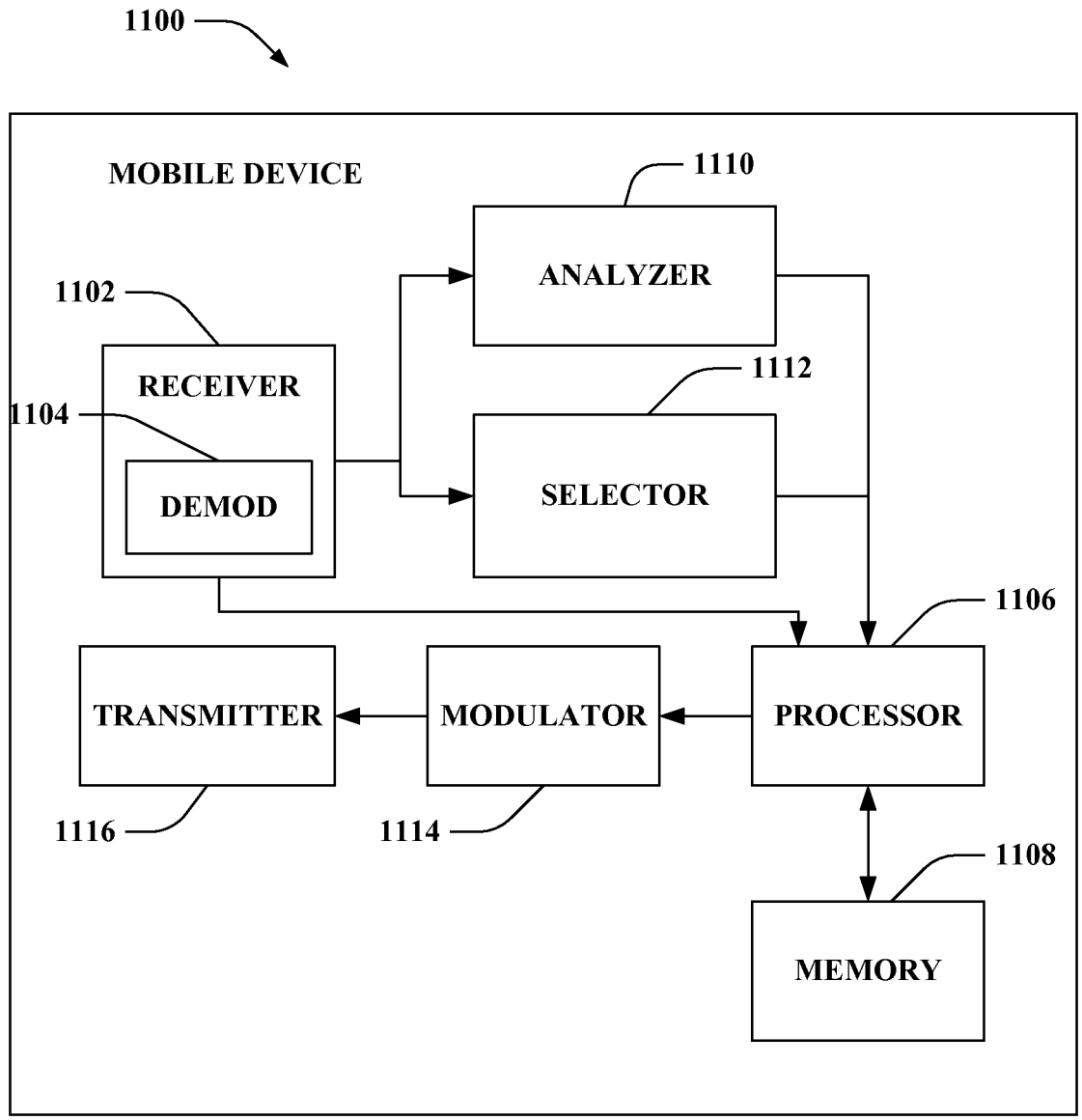
FIG. 11 illustrates a representative mobile device in accordance with at least one aspect disclosed herein.

FIG. 11 is an illustration of a mobile device 1100 that facilitates using a sequence resource assigned through use of a cyclic shift. Mobile device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of mobile device 1100, and/or a processor that both analyzes information received by receiver 1102, generates information for transmission by transmitter 1116, and controls one or more components of mobile device 1100.

Mobile device 1100 can additionally comprise memory 1108 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1108 can additionally store protocols and/or algorithms associated with estimating and/or utilizing a channel (e.g., performance based, capacity based, etc.).

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Processor 1102 is further operatively coupled to an analyzer 1110 and/or a selector 1112. The analyzer 1110 can evaluate a sequence resource instruction on a sequence resource assigned for use from a base station, the sequence resource is assigned through implementation of a generated cyclic shift. Moreover, the selector 1112 can identify a sequence resource to use based upon a result of the evaluation. Mobile device 1100 still further comprises a modulator 1114 and a transmitter 1116 that transmits a signal (e.g., base CQI and differential CQI) to, for instance, a base station, another mobile device, etc. Although depicted as being separate from the processor 1106, it is to be appreciated that the analyzer 1110 and/or selector 1112 can be part of processor 1106 or a number of processors (not shown).

Figure 12:
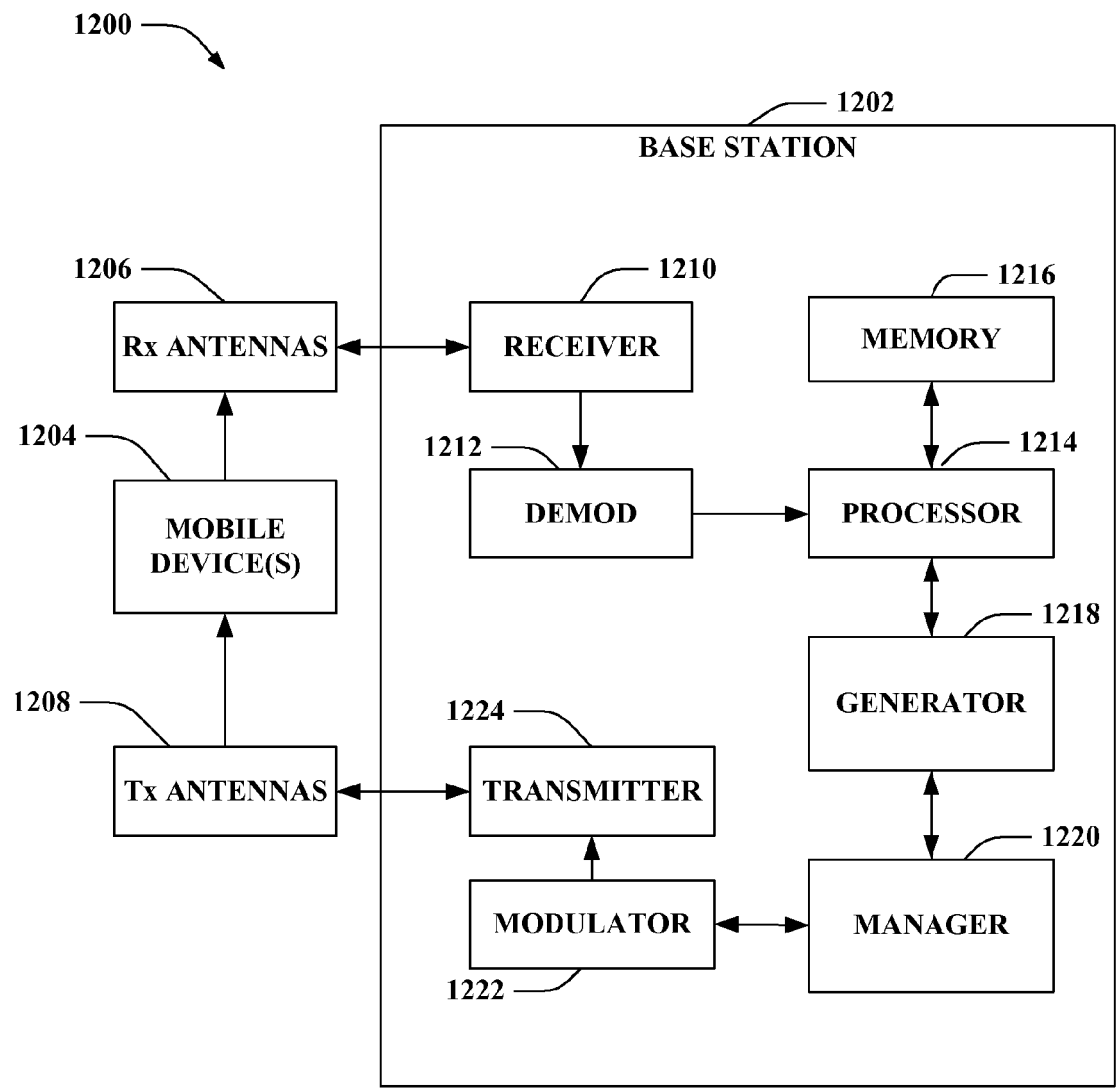
FIG. 12 illustrates a representative base station in accordance with at least one aspect disclosed herein.

FIG. 12 is an illustration of a system 1200 that facilitates assignment of a sequence resource. System 1200 comprises a base station 1202 (e.g., access point, . . . ) with a receiver 1210 that receives signal(s) from one or more mobile devices 1204 through a plurality of receive antennas 1206, and a transmitter 1222 that transmits to the one or more mobile devices 1204 through a plurality of transmit antennas 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores information related to estimating a signal (e.g., pilot) strength and/or interference strength, data to be transmitted to or received from mobile device(s) 1204 (or a disparate base station (not shown)), and/or any other suitable information related to performing the various actions and functions set forth herein.

Processor 1214 is further coupled to a generator 1218 and/or to an assigner 1220. The generator 1218 can produce a cyclic shift for use in random assignment of a sequence resource to a mobile device. Moreover, the assigner 1220 can assign a sequence resource randomly through implementation of the generated cyclic shift. Information to be transmitted can be provided to a modulator 1222. Modulator 1222 can multiplex the information for transmission by a transmitter 1224 through antenna 1208 to mobile device(s) 1204. Although depicted as being separate from the processor 1214, it is to be appreciated that the generator 1218 and/or assigner 1220 can be part of processor 1214 or a number of processors (not shown).

Figure 13:
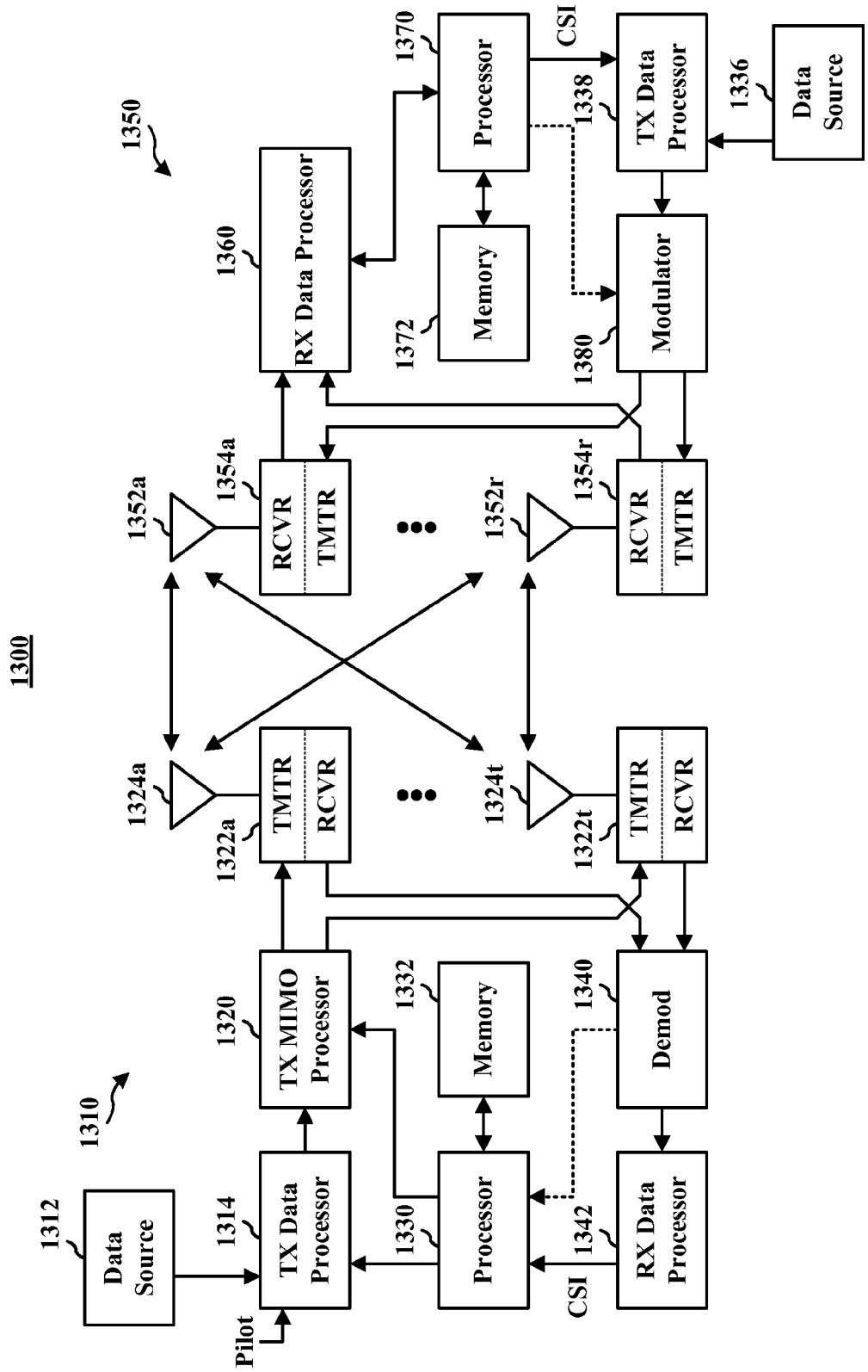
FIG. 13 illustrates a representative communication system in accordance with at least one aspect disclosed herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-7 and 11-12) and/or methods (FIGS. 8-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides NT modulation symbol streams to NT transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1322a through 1322t are transmitted from NT antennas 1324a through 1324t, respectively.

At mobile device 1350, the transmitted modulated signals are received by NR antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the NR received symbol streams from NR receivers 1354 based on a particular receiver processing technique to provide NT "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which precoding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
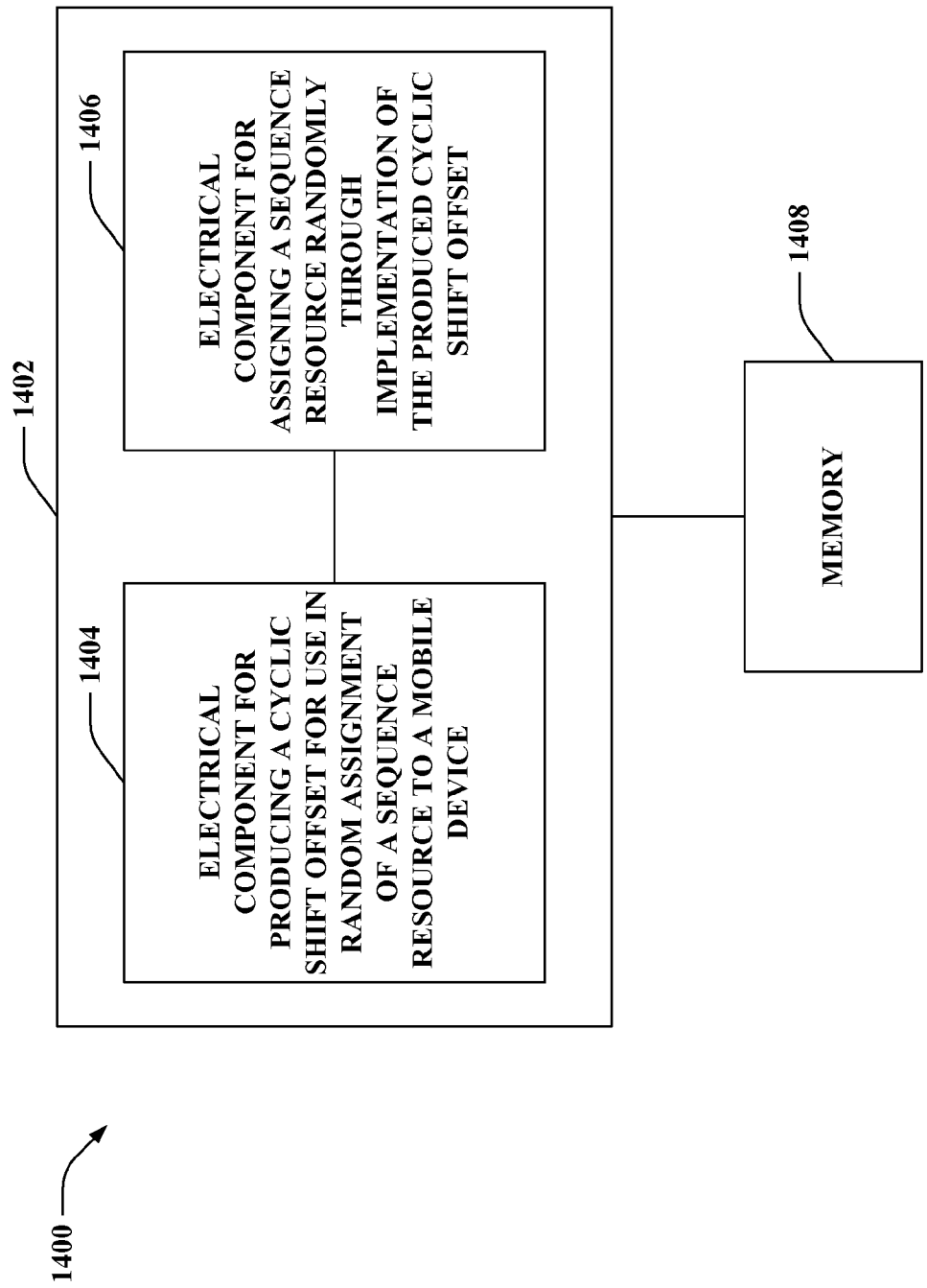
FIG. 14 illustrates a representative base station in accordance with at least one aspect disclosed herein.

With reference to FIG. 14, illustrated is a system 1400 that facilitates sequence resource management. For example, system 1400 can reside at least partially within a mobile device. It is to be appreciated that system 1400 is represented as including functional blocks, which can be functional blocks that represent functions implemented by a processor, software, or combination thereof (e.g., firmware). System 1400 includes a logical grouping 1402 of means (e.g., electrical components) that can facilitate operation. For instance, logical grouping 1402 can include an electrical component for producing a cyclic shift offset for use in random assignment of a sequence resource to a mobile device 1404 and/or an electrical component for assigning a sequence resource randomly through implementation of the produced cyclic shift offset 1406. Additionally, system 1400 can include a memory 1408 that retains instructions for executing functions associated with electrical components 1404 and 1406. While shown as being external to memory 1408, it is to be understood that one or more of electrical components 1404 and 1406 can exist within memory 1408.

Figure 15:
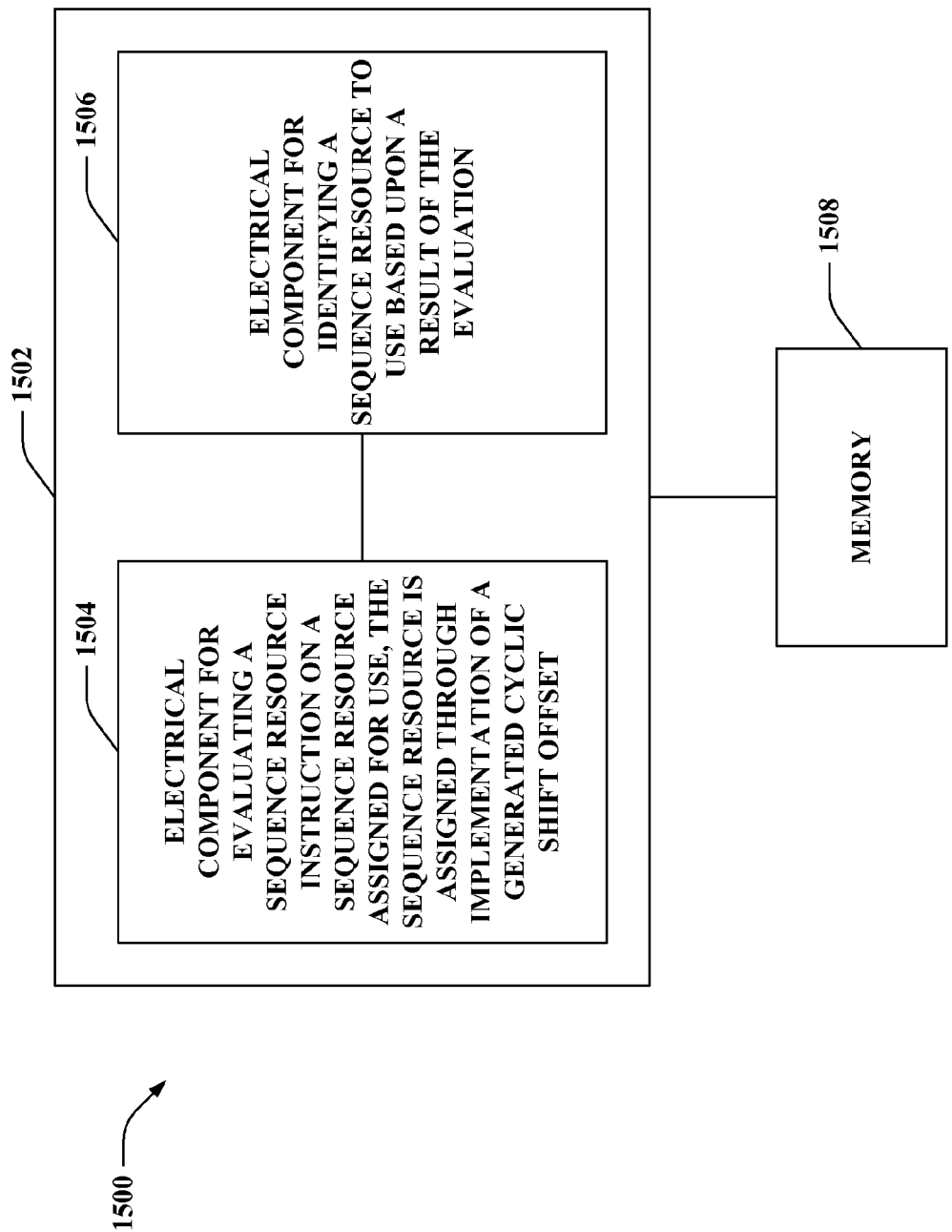
FIG. 15 illustrates a representative mobile device in accordance with at least one aspect disclosed herein.

Turning to FIG. 15, illustrated is a system 1500 facilitates usage of sequence resources. System 1500 can reside within a base station, for instance. As depicted, system 1500 includes functional blocks that can represent functions implemented by a processor, software, or combination thereof (e.g., firmware). System 1500 includes a logical grouping 1502 of means (e.g., electrical components) that can facilitate operation. Logical grouping 1502 can include an electrical component for evaluating a sequence resource instruction on a sequence resource assigned for use from a base station, the sequence resource is assigned through implementation of a generated cyclic shift offset 1504. In addition, the logical grouping 1502 can include an electrical component for identifying a sequence resource to use based upon a result of the evaluation 1506. Additionally, system 1500 can include a memory 1508 that retains instructions for executing functions associated with electrical components 1504 and 1506. While shown as being external to memory 1508, it is to be understood that electrical components 1504 and 1506 can exist within memory 1508.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method performed by at least one processor for allocating a sequence resource through randomization that is operable upon a wireless communication device, comprising:
   adding together a pseudo-random sequence and a deterministic sequence, wherein a result of the addition is an initial offset;
   producing a cyclic shift offset using the initial offset, wherein the cyclic shift offset is for use in random assignment of the sequence resource to a mobile device performed by a first module executable upon the wireless communication device, wherein producing the cyclic shift offset is performed in a coordinated manner; and
   assigning the sequence resource randomly through implementation of the produced cyclic shift offset performed by a second module executable upon the wireless communication device.

2. A method performed by at least one processor for allocating a sequence resource through randomization that is operable upon a wireless communication device, comprising:
scrambling an output of a sequence generator, wherein the scrambled output is an initial offset;
producing a cyclic shift offset, using the initial offset, for use in random assignment of the sequence resource to a mobile device performed by a first module executable upon the wireless communication device, wherein producing the cyclic shift offset is performed in an uncoordinated manner; and
assigning the sequence resource randomly through implementation of the produced cyclic shift offset performed by a second module executable upon the wireless communication device.

3. A method performed by at least one processor for allocating a sequence resource through randomization that is operable upon a wireless communication device, comprising:
determining a distance among at least two base stations;
inferring if the distance is such that interference is expected between at least one mobile device associated with each base station;
determining if a cyclic shift offset should be coordinated or uncoordinated based upon a result of the inferring;
producing the cyclic shift offset for use in random assignment of the sequence resource to a mobile device performed by a first module executable upon the wireless communication device; and
assigning the sequence resource randomly through implementation of the produced cyclic shift offset performed by a second module executable upon the wireless communication device.

4. An apparatus, comprising:
an aggregator that adds together a pseudo-random sequence and a deterministic sequence, wherein a result of the addition is an initial offset;
a generator that produces a cyclic shift offset, using the initial offset, for use in random assignment of a sequence resource to a mobile device, wherein producing the cyclic shift offset is performed in a coordinated manner; and
an assigner that designates the sequence resource randomly through implementation of the produced cyclic shift offset.

5. An apparatus, comprising:
a shuffler that scrambles an output of a sequence generator, wherein the scrambled output is an initial offset;
a generator that produces a cyclic shift offset, using the initial offset, for use in random assignment of a sequence resource to a mobile device, wherein producing the cyclic shift offset is performed in an uncoordinated manner; and
an assigner that designates the sequence resource randomly through implementation of the produced cyclic shift offset.

6. An apparatus, comprising:
a measurer that determines a distance among at least two base stations;
a concluder that infers if the distance is such that interference is expected between at least one mobile device associated with each base station;
a classifier that determines if a cyclic shift offset should be coordinated or uncoordinated based upon a result of the inference;
a generator that produces the cyclic shift offset for use in random assignment of a sequence resource to a mobile device; and
an assigner that designates the sequence resource randomly through implementation of the produced cyclic shift offset.

7. At least one processor configured to allocate a sequence resource through randomization, comprising:
a first module for producing a cyclic shift offset, using an initial offset, for use in random assignment of the sequence resource to a mobile device, wherein the initial offset is a result of adding together a pseudo-random sequence and a deterministic sequence, and wherein the cyclic offset is produced in a coordinated manner; and
a second module assigning the sequence resource randomly through implementation of the produced cyclic shift offset.

8. A computer program product, comprising:
a non-transitory computer-readable medium comprising:
a first set of codes for causing a computer to produce a cyclic shift offset, using an initial offset, for use in random assignment of a sequence resource to a mobile device, wherein the initial offset is a result of adding together a pseudo-random sequence and a deterministic sequence, and wherein the cyclic offset is produced in a coordinated manner; and
a second set of codes for causing the computer to assign the sequence resource randomly through implementation of the produced cyclic shift offset.

9. An apparatus, comprising:
means for producing a cyclic shift offset, using an initial offset, for use in random assignment of a sequence resource to a mobile device, wherein the initial offset is a result of adding together a pseudo-random sequence and a deterministic sequence, and wherein the cyclic offset is produced in a coordinated manner; and
means for assigning the sequence resource randomly through implementation of the produced cyclic shift offset.

10. A method performed by at least one processor for using a resource, the method is operable upon a wireless communication device, comprising:
evaluating a sequence resource instruction on a sequence resource assigned for use, wherein the sequence resource is assigned through implementation of a cyclic shift offset, and wherein the evaluating is performed by a first module executable upon the wireless communication device; and
identifying the sequence resource to use based upon a result of the evaluating, wherein the identifying is performed by a second module executable upon the wireless communication device;
wherein a pseudo-random sequence and a deterministic sequence are added together, a result of the addition is an offset used to generate the cyclic shift offset, and wherein generation of the cyclic shift offset is coordinated.

11. The method of claim 10, wherein the mobile device is not likely to interfere with a mobile device using another base station.

12. The method of claim 10, further comprising providing location metadata, wherein at least a portion of the provided location metadata is used to determine a manner of cyclic shift offset generation.

13. A method performed by at least one processor for using a resource, the method is operable upon a wireless communication device, comprising:
evaluating a sequence resource instruction on a sequence resource assigned for use, wherein the sequence resource is assigned through implementation of a generated cyclic shift offset, and wherein the evaluating is performed by a first module executable upon the wireless communication device; and identifying the sequence resource to use based upon a result of the evaluation, wherein the identifying is performed by a second module executable upon the wireless communication device, wherein generation of the cyclic shift offset is coordinated, and wherein coordinated cyclic shift offset generation occurs upon processing of an interference notification.

14. A method performed by at least one processor for using a resource, the method is operable upon a wireless communication device, comprising:

evaluating a sequence resource instruction on a sequence resource assigned for use, wherein the sequence resource is assigned through implementation of a generated cyclic shift offset, and wherein the evaluating is performed by a first module executable upon the wireless communication device; and identifying the sequence resource to use based upon a result of the evaluation, wherein the identifying is performed by a second module executable upon the wireless communication device, wherein the cyclic shift offset is generated through use of a scrambled output of a sequence generator and generation of the cyclic shift offset is uncoordinated.

15. An apparatus, comprising:

an analyzer that evaluates a sequence resource instruction on a sequence resource assigned for use, the sequence resource is assigned through implementation of a generated cyclic shift offset; and a selector that identifies the sequence resource to use based upon a result of the evaluation, wherein a pseudo-random sequence and a deterministic sequence are added together, wherein a result of the addition is an offset used to generate the cyclic shift offset, and wherein generation of the cyclic shift offset is coordinated.

16. The apparatus of claim 15, wherein the mobile device is likely to interfere with a mobile device using another base station.

17. The apparatus of claim 15, further comprising a transmitter that provides location metadata, wherein at least a portion of the provided location metadata is used to determine a manner of cyclic shift offset generation.

18. An apparatus, comprising:

an analyzer that evaluates a sequence resource instruction on a sequence resource assigned for use, the sequence resource is assigned through implementation of a generated cyclic shift offset; and a selector that identifies the sequence resource to use based upon a result of the evaluation, wherein generation of the cyclic shift offset is coordinated, and wherein coordinated cyclic shift offset generation occurs upon processing of an interference notification.

19. An apparatus, comprising:

an analyzer that evaluates a sequence resource instruction on a sequence resource assigned for use, the sequence resource is assigned through implementation of a generated cyclic shift offset; and a selector that identifies the sequence resource to use based upon a result of the evaluation, wherein generation of the cyclic shift offset is uncoordinated, and wherein the cyclic shift offset is generated through use of a scrambled output of a sequence generator.

20. At least one processor configured to use a resource comprising:

a first module for evaluating a sequence resource instruction on a sequence resource assigned for use, the sequence resource is assigned through implementation of a generated cyclic shift offset; and a second module for identifying the sequence resource to use based upon a result of the evaluation, wherein a pseudo-random sequence and a deterministic sequence are added together, wherein a result of the addition is an offset used to generate the cyclic shift offset, and wherein generation of the cyclic shift offset is coordinated.

21. A computer program product, comprising:

a non-transitory computer-readable medium comprising:

a first set of codes for causing a computer to evaluate a sequence resource instruction on a sequence resource assigned for use, the sequence resource is assigned through implementation of a generated cyclic shift offset; and a second set of codes for causing the computer to identify the sequence resource to use based upon a result of the evaluation, wherein a pseudo-random sequence and a deterministic sequence are added together, wherein a result of the addition is an offset used to generate the cyclic shift offset, and wherein generation of the cyclic shift offset is coordinated.

22. An apparatus, comprising:

means for evaluating a sequence resource instruction on a sequence resource assigned for use, the sequence resource is assigned through implementation of a generated cyclic shift offset; and means for identifying the sequence resource to use based upon a result of the evaluation, wherein a pseudo-random sequence and a deterministic sequence are added together, wherein a result of the addition is an offset used to generate the cyclic shift offset, and wherein generation of the cyclic shift offset is coordinated.

23. A computer program product, comprising:

a non-transitory computer-readable medium comprising:

a first set of codes for causing a computer to produce a cyclic shift offset, using an initial offset, for use in random assignment of a sequence resource to a mobile device, wherein the initial offset is scrambled output of a sequence generator, and wherein the cyclic offset is produced in an uncoordinated manner; and a second set of codes for causing the computer to assign the sequence resource randomly through implementation of the produced cyclic shift offset.

24. An apparatus, comprising:

means for producing a cyclic shift offset, using an initial offset, for use in random assignment of a sequence resource to a mobile device, wherein the initial offset is scrambled output of a sequence generator, and wherein the cyclic offset is produced in an uncoordinated manner; and means for assigning the sequence resource randomly through implementation of the produced cyclic shift offset.

25. A computer program product, comprising:

a non-transitory computer-readable medium comprising codes for causing a computer to:

determine a distance among at least two base stations;

infer if the distance is such that interference is expected between at least one mobile device associated with each base station;

determine if a cyclic shift offset should be coordinated or uncoordinated based upon a result of the inferring;

produce the cyclic shift offset for use in random assignment of a sequence resource to a mobile device performed by a first module executable upon the wireless communication device; and assign the sequence resource randomly through implementation of the produced cyclic shift offset performed by a second module executable upon the wireless communication device.

26. An apparatus, comprising:

means for determining a distance among at least two base stations;

means for inferring if the distance is such that interference is expected between at least one mobile device associated with each base station;

means for determining if a cyclic shift offset should be coordinated or uncoordinated based upon a result of the inferring;

means for producing the cyclic shift offset for use in random assignment of a sequence resource to a mobile device performed by a first module executable upon the wireless communication device; and means for assigning the sequence resource randomly through implementation of the produced cyclic shift offset performed by a second module executable upon the wireless communication device.

27. A computer program product, comprising:

a non-transitory computer-readable medium comprising:

a first set of codes for causing a computer to evaluate a sequence resource instruction on a sequence resource assigned for use, the sequence resource is assigned through implementation of a generated cyclic shift offset; and a second set of codes for causing the computer to identify the sequence resource to use based upon a result of the evaluation, wherein generation of the cyclic shift offset is coordinated, and wherein coordinated cyclic shift offset generation occurs upon processing of an interference notification.

28. An apparatus, comprising:

means for evaluating a sequence resource instruction on a sequence resource assigned for use, the sequence resource is assigned through implementation of a generated cyclic shift offset; and means for identifying the sequence resource to use based upon a result of the evaluation, wherein generation of the cyclic shift offset is coordinated, and wherein coordinated cyclic shift offset generation occurs upon processing of an interference notification.

29. A computer program product, comprising:

a non-transitory computer-readable medium comprising:

a first set of codes for causing a computer to evaluate a sequence resource instruction on a sequence resource assigned for use, the sequence resource is assigned through implementation of a generated cyclic shift offset; and a second set of codes for causing the computer to identify the sequence resource to use based upon a result of the evaluation, wherein generation of the cyclic shift offset is uncoordinated, and wherein the cyclic shift offset is generated through use of a scrambled output of a sequence generator.

30. An apparatus, comprising:

means for evaluating a sequence resource instruction on a sequence resource assigned for use, the sequence resource is assigned through implementation of a generated cyclic shift offset; and means for identifying the sequence resource to use based upon a result of the evaluation, wherein generation of the cyclic shift offset is uncoordinated, and wherein the cyclic shift offset is generated through use of a scrambled output of a sequence generator.

* * * * *